(12) United States Patent
Okaji et al.

(10) Patent No.: US 6,225,015 B1
(45) Date of Patent: May 1, 2001

(54) OXYTITANIUM PHTHALOCYANINE PROCESS FOR THE PRODUCTION THEREOF AND ELECTROPHOTOGRAPHIC PHOTORECEPTOR TO WHICH THE OXYTITANIUM PHTHALOCYANINE IS APPLIED

(75) Inventors: Makoto Okaji; Michihiko Sato; Kazuyuki Suruga; Tamotsu Horiuchi, all of Tokyo (JP)

(73) Assignee: Mitsubishi Paper Mills Ltd., Tokyo (JP)

( * ) Notice: Subject to any disclaimer, the term of this patent is extended or adjusted under 35 U.S.C. 154(b) by 0 days.

(21) Appl. No.: 09/324,915

(22) Filed: Jun. 3, 1999

(30) Foreign Application Priority Data

| Jun. 4, 1998 | (JP) | 10-155445 |
|---|---|---|
| Feb. 17, 1999 | (JP) | 11-038549 |
| Feb. 25, 1999 | (JP) | 11-048803 |
| Mar. 11, 1999 | (JP) | 11-064511 |
| Mar. 12, 1999 | (JP) | 11-066269 |

(51) Int. Cl.[7] ............................ G03G 5/06; C09B 67/04
(52) U.S. Cl. ........................ 430/78; 430/59.5; 430/83; 540/141
(58) Field of Search .................. 430/59.5, 78, 83; 540/141

(56) References Cited

U.S. PATENT DOCUMENTS

| 3,824,099 | 7/1974 | Champ et al. | 430/58.55 |
|---|---|---|---|
| 4,123,269 | 10/1978 | Von Hoene et al. | 430/67 |
| 4,150,987 | 4/1979 | Anderson et al. | 430/58.45 |
| 4,664,997 | * 5/1987 | Suzuki et al. | 430/78 |
| 4,994,566 | 2/1991 | Mimura et al. | 540/141 |
| 5,132,197 | 7/1992 | Iuchi et al. | 430/78 |
| 5,252,417 | 10/1993 | Tokida et al. | 430/78 |
| 5,298,353 | * 3/1994 | Ohmori | 430/59.5 |
| 5,593,805 | * 1/1997 | Go et al. | 430/78 |
| 5,753,395 | * 5/1998 | Kinoshita et al. | 540/141 |
| 5,905,009 | * 5/1999 | Nakamura et al. | 430/59.5 |

FOREIGN PATENT DOCUMENTS

| 34-5466 | 6/1959 | (JP) . |
|---|---|---|
| 45-555 | 1/1970 | (JP) . |
| 52-4188 | 2/1977 | (JP) . |
| 54-58445 | 5/1979 | (JP) . |
| 55-42380 | 10/1980 | (JP) . |
| 56-123544 | 9/1981 | (JP) . |
| 58-65440 | 4/1983 | (JP) . |
| 60-24553 | 2/1985 | (JP) . |
| 60-98437 | 6/1985 | (JP) . |
| 61-217050 | 9/1986 | (JP) . |
| 62-67094 | 3/1987 | (JP) . |
| 63-20365 | 1/1988 | (JP) . |
| 64-17066 | 1/1989 | (JP) . |
| 1-142658 | 6/1989 | (JP) . |
| 1-221461 | 9/1989 | (JP) . |
| 2-51162 | 2/1990 | (JP) . |
| 2-96767 | 4/1990 | (JP) . |
| 2-183260 | 7/1990 | (JP) . |
| 2-226160 | 9/1990 | (JP) . |
| 3-35064 | 2/1991 | (JP) . |
| 3-35245 | 2/1991 | (JP) . |
| 3-75660 | 3/1991 | (JP) . |
| 3-128973 | 5/1991 | (JP) . |
| 3-134065 | 6/1991 | (JP) . |
| 6-39575 | 5/1994 | (JP) . |

* cited by examiner

Primary Examiner—Roland Martin
(74) Attorney, Agent, or Firm—Nixon & Vanderhye

(57) ABSTRACT

Oxytitanium phthalocyanine having a novel crystal form having excellent electrophotographic properties, such as a high charge potential, a high sensitivity and stable performances free from causing changes in various properties in repeated use, can be produced in the absence of a halogen substance, by carrying out the crystal transformation of amorphous oxytitanium phthalocyanine in a solvent comprising water and naphthalene.

10 Claims, 20 Drawing Sheets

OXYTITANIUM PHTHALOCYANINE PROCESS FOR THE PRODUCTION THEREOF AND ELECTROPHOTOGRAPHIC PHOTORECEPTOR TO WHICH THE OXYTITANIUM PHTHALOCYANINE IS APPLIED

FIELD OF THE INVENTION

The present invention relates to a oxytitanium phthalocyanine (to be abbreviated as "TiOPc" hereinafter) and a process for the production thereof, and it also relates to an electrophotographic photoreceptor to which it is applied.

PRIOR ART

In recent years, electrophotography is not only used in the field of copying machines, but also it now has come into wide use in the fields of a printing plate, a slide film and a microfilm where photography has been conventionally used. Further, studies are being made on the application of electrophotography to a high-speed printer using a laser, an LED or a CRT as a light source. In recent years, studies have also began concerning the application of photoconductive materials to uses other than the electrophotographic photoreceptor, such as electrostatic recording elements, sensor materials and an EL devices. A photoconductive material and an electrophotographic photoreceptor using the same are therefore being demanded to satisfy higher levels in wider fields of applications. For an electrophotographic photoreceptor, inorganic photoconductive materials such as selenium, cadmium sulfide, zinc oxide and silicon have been known and widely studied to put them into practical use. These inorganic materials have various advantages and at the same time have various disadvantages. For example, selenium has defects that production conditions with it are severe and that it is easily crystallized due to heat or mechanical impact. Cadmium sulfide and zinc oxide are poor in humidity resistance and durability. It is pointed out that silicon has poor chargeability and difficulty of production. Further, selenium and cadmium sulfide also involve toxicity problems.

In contrast, organic photoconductive materials have advantages that they are excellent in film-formability and flexibility, that they are light in weight and excellent in transparency and that they are feasible for designing a photoreceptor to light in a wide wavelength region according to a proper sensitizing method. For these reasons, practical use thereof is gradually attracting attention.

Meanwhile, a photoreceptor for use in electrophotography is required to satisfy the following general basic properties. That is, (1) it is to have a high chargeability to corona discharge in a dark place, (2) it is to be free of much leakage of an obtained charge in a dark place (small dark decay), (3) it is to readily dissipate a charge on irradiation with light (small light decay), and (4) it is to be free of residual charge after irradiation with light.

However, as organic photoconductive materials, photoconductive polymers including polyvinylcarbazole have been so far studied in various ways, while these are not necessarily satisfactory in film formability, flexibility and adhesion and cannot be said to fully have the above basic properties as a photoreceptor.

Organic low-molecular-weight photoconductive compounds can give a photoreceptor excellent in film formability, adhesion and mechanical properties such as flexibility by selecting a binder for forming the photoreceptor, while it is difficult to find out a compound suitable for retaining high-sensitivity properties.

For overcoming the above problems, there have been developed organic photoreceptors having higher sensitivity properties imparted by using different materials which separately have charge generation function and a charge transportation function. These photoreceptors called a function-separation type has a feature in that materials suitable for individual functions can be selected from a broad range of materials, and a photoreceptor having predetermined performances can be easily produced, so that studies have been extensively under way.

Of these materials, various materials such as phthalocyanine pigments, squarilium dyes, azo pigments and perylene pigments have been studied as a material having the role of charge generation. Above all, azo pigments have been studied in various ways and practically have been in wide use since they can have diversified molecular structures and can be expected to show a high charge generation efficiency. However, it has not yet been clear what relationships are there between the molecular structure and the charge generation efficiency of the azo pigments. Under the circumstances, a huge volume of studies have been made on syntheses thereof to find out optimum structures, while there have not yet been obtained any azo pigments which satisfy demands of the above basic properties and high durability as a photoreceptor.

In recent years, further, laser beam printers having advantages of a high speed, a high-quality image and non-impact properties by using laser beam in place of conventional white light are widely used together with advanced data processing systems, and it is accordingly desired to develop materials which can comply with requirements therefor. Of laser beams, a semiconductor laser, which has been and is increasingly applied to a compact disc, an optical disc, etc., in recent years and has been remarkably technically developed, is actively applied to the field of printers as a compact and highly reliable light source material. In this case, the wavelength of the light source is approximately 780 nm, and it is therefore intensely desired to develop a photoreceptor having high-sensitivity properties to light having a long wavelength of approximately 780 nm. Under the circumstances, developments of photoreceptors using phthalocyanines having light absorption in a near infrared region are actively under way.

Not only phthalocyanines differ in absorption spectrum, photoconductivity, etc., depending upon central metals, but also phthalocyanines having an identical central metal differ in the above various properties depending upon crystal forms, and it is reported that phthalocyanines having specific crystal forms are selected for an electrophotographic photoreceptor.

For example, concerning TiOPc, JP-A-61-217050 discloses an α-form TiOPc having main diffraction peaks at Bragg angles of 7.6°, 10.2°, 22.3°, 25.3° and 28.6° in X-ray diffraction spectrum, and JP-A-62-67094 discloses a β-form TiOPc having main diffraction peaks at Bragg angles of 9.3°, 10.6°, 13.2°, 15.1°, 15.7°, 16.1°, 20.8°, 23.3°, 26.3° and 27.1°. However, these phthalocyanines fail to fully satisfy required high properties.

JP-A-1-17066 discloses a Y-form TiOPc which has diffraction peaks at 9.5°, 9.7°, 11.7°, 15.0°, 23.5°, 24.1° and 27.3° and exhibits relatively good sensitivity. For the synthesis in the above crystal form, JP-A-63-20365 discloses a method in which an aqueous suspension of α-form TiOPc treated by acid pasting is subjected to crystal transformation in a chlorinated benzene solvent. JP-A-3-35245 discloses a method in which an aqueous suspension of amorphous TiOPc is subjected to crystal transformation in the presence of o-dichlorobenzene or 1,2-dichloroethane. In view of environmental pollution problems in recent years, such as the incidence of dioxin, the use of the chlorinated benzene is undesirable.

As a production method using no halogen substance, JP-A-3-35064 discloses a crystal transformation method in the presence of cyclohexanone, tetrahdyrofuran or cyclohexanol, and JP-A-3-134065 discloses a crystal transformation method in the presence of an aromatic hydrocarbon such as toluene or xylene or monoterpene solvent such as terpinene, myrcene or limonene. However, TiOPc obtained by any one of these methods shows a low sensitivity.

Further, an electrophotographic photoreceptor formed of any one of the above phthalocyanines has a defect that the chargeability thereof is poor at the step of development after the charging procedure in the first round of an image forming process is finished and the chargeability is stabilized only in the second round and thereafter. This phenomenon is related to a standing period of time after the process of image formation such as charging and exposure. There is observed a tendency that the chargeability in the first round come to be poor with an increase in the standing period of time. This will explain that the above phenomenon is caused by the accumulation of a charge generated by the thermal excitation of a charge-generating material in a photosensitive layer or by the accumulation of a charge injected into a photosensitive layer from an electrically conductive support.

In recent years, with improvements in data processing units, the rate of data transfer and the rate of data process increase, and for accomplishing the printing rate which reflects such increases, it has come to be demanded to use a photoreceptor for image formation from the first round of the photoreceptor. In a photoreceptor which shows poor chargeability in a development step in the first round of processing as described above, there is fogged a white background of an image formed in the first round process in a digital image formation according to an inversion development method, and it is difficult to produce a clear image. It is therefore required to improve the chargeability in the development step in the first round processing.

Further, an electrophotographic photoreceptor using an organic photoconductive material also has another defect that the charge potential and the residual potential thereof come to vary to a greater extent as the process of charging, exposure and erasing is repeated. When the stability of a photoreceptor in repeated use is poor as described above, the contrast of formed images decreases in the repeated use, and image fogging is caused, when copies are actually made.

In the production of electrophotographic photoreceptors, improvements have been added in various ways as described above. However, excellent properties are obtained only when a halogen substance is used during the production thereof, and at the present, there has been obtained no electrophotographic photoreceptor which fully satisfies the above basic properties and the high durability which the photoreceptor is required to have. Further, production methods which have been so far proposed are based on a concept that a raw material in a liquid state at room temperature is used.

SUMMARY OF THE INVENTION

It is an object of the present invention to provide an electrophotographic photoreceptor which shows a high charge potential and a high sensitivity and which can exhibit stable performances without a change in various properties when used repeatedly.

It is another object of the present invention to provide TiOPc which is applied to the above electrophotographic photoreceptor and which can be produced in the absence of a halogen substance.

The present inventors have made diligent studies to achieve the above objects and have found that TiOPc having a high sensitivity can be obtained by carrying out the crystal transformation in a solvent containing water and naphthalene at a proper temperature and that an electrophotographic photoreceptor having stable electrophotographic properties can be obtained by forming, on an electrically conductive support, a photosensitive layer comprising the above TiOPc and at least one of the compounds of the following formula (1) to (6).

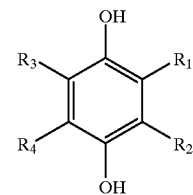

(1)

wherein each of $R_1$, $R_2$, $R_3$ and $R_4$ is independently hydrogen, halogen, alkyl, aryl, alkenyl, alkoxy, alkylthio, carbamoyl, nitro or carboxyl.

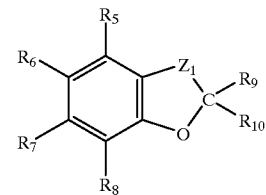

(2)

wherein each of $R_5$, $R_6$, $R_7$ and $R_8$ is independently hydrogen, hydroxyl, alkyl or alkoxy, provided that at least one of $R_5$ to $R_8$ is hydroxyl, each of $R_9$ and $R_{10}$ is independently hydrogen, alkyl or alkenyl, and $Z_1$ is an atomic group necessary for forming a 2H-chromene structure, a chroman structure or dihydrobenzofuran structure together with a benzene ring in the formula, provided that the atomic group may further contain a substituent or substituents.

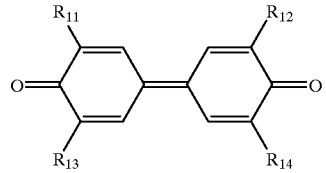

(3)

wherein each of $R_{11}$, $R_{12}$, $R_{13}$ and $R_{14}$ is independently hydrogen, halogen, alkyl or alkoxy.

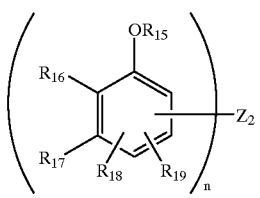

(4)

wherein $R_{15}$ is hydrogen, alkyl or aryl, $R_{16}$ is alkyl, each of $R_{17}$, $R_{18}$ and $R_{19}$ is independently hydrogen, alkyl or aryl, and n is an integer of 1 to 4, provided that when n is 1, $Z_2$ is hydrogen, alkyl or aryl and that when n is 2 or more, $Z_2$ is alkylene, arylene or sulfide.

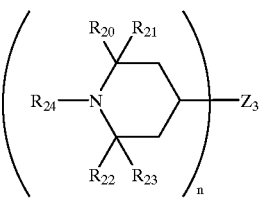

(5)

wherein each of $R_{20}$, $R_{21}$, $R_{22}$ and $R_{23}$ is independently alkyl, $R_{24}$ is hydrogen or alkyl, and n is an integer of 1 to 4, provided that when n is 1, $Z_3$ is acyloxy, aroyloxy, alkoxy, aryloxy or $NR_{25}R_{26}$ in which each of $R_{25}$ and $R_{26}$ is hydrogen, alkyl, aryl, aralkyl, acyl, aroyl or arylsulfonyl, and that when n is 2 or more, $Z_3$ is a linking group containing two or more acyloxy or aroyloxy groups.

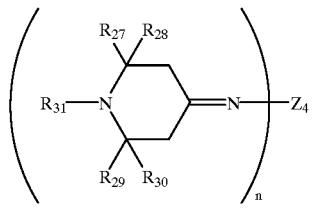

(6)

wherein each of $R_{27}$, $R_{28}$, $R_{29}$ and $R_{30}$ is independently alkyl, $R_{31}$ is hydrogen or alkyl, and n is an integer of 1 to 4, provided that when n is 1, $Z_4$ is acyloxy, aroyloxy, alkoxy or $NR_{32}R_{33}$ in which each of $R_{32}$ and $R_{33}$ is hydrogen, alkyl, aryl, aralkyl, acyl, aroyl or arylsulfonyl, and that when n is 2 or more, $Z_4$ is a linking group containing two or more acyloxy or acryloxy groups.

DETAILED DESCRIPTION OF THE INVENTION

Figure 1:
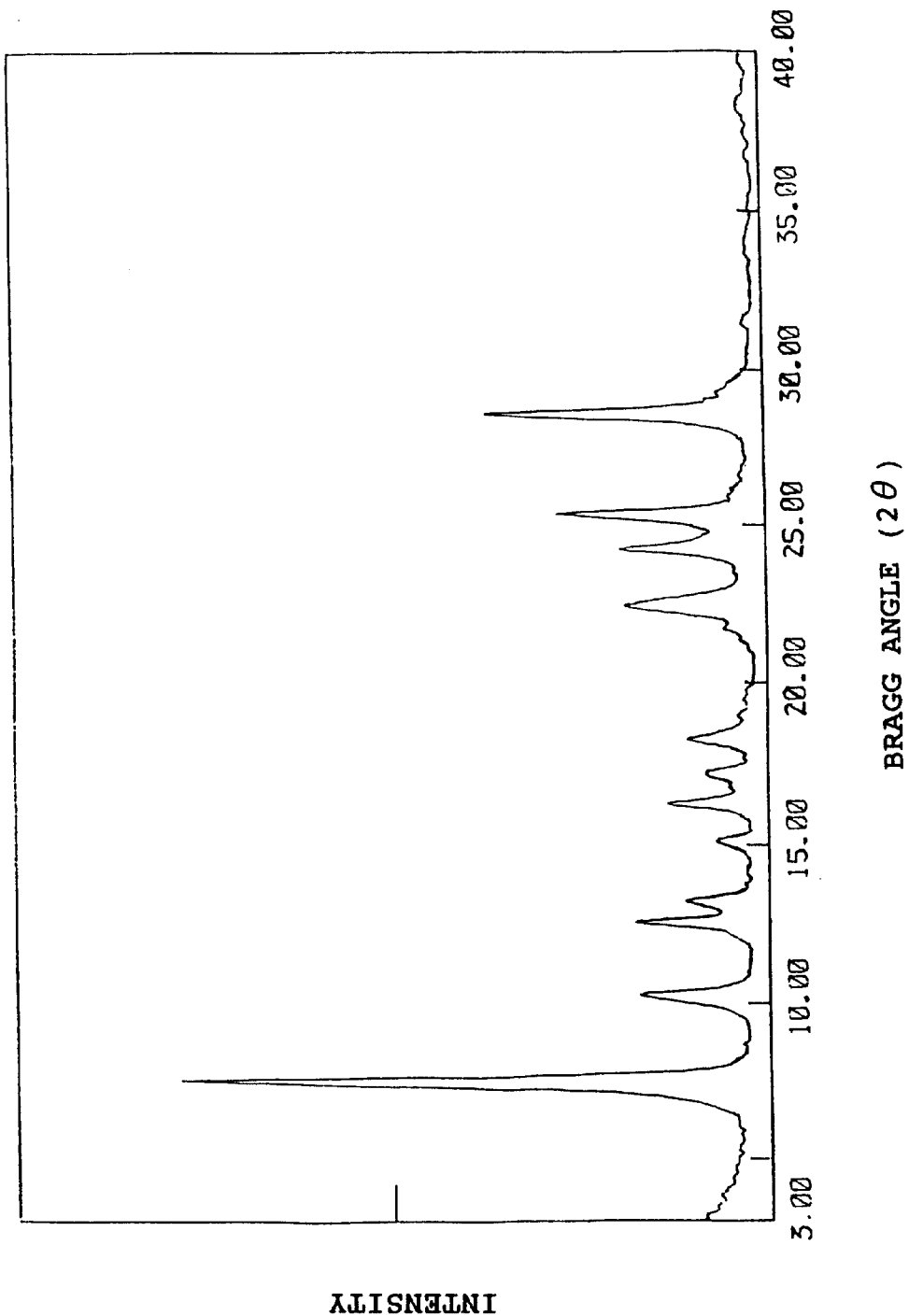
FIG. 1 shows an X-ray diffraction spectrum of TiOPc obtained in Synthesis Example 1.

TiOPc per se used in the present invention can be prepared by a known method, e.g., a method described in "Phthalocyanine Compounds" authored by F. H. Moser and A. L. Thomas and published in 1963. According to the above method, TiOPc can be easily obtained. Further, TiOPc can be prepared, for example, by a method using a condensation reaction of phthalodinitrile and titanium tetrachloride, or a method in which 1,3-diiminoisoindoline and titanium tetraalkoxide are allowed to react, as is disclosed in PB 85172. FIAT. FINAL REPORT 1313 Feb. 1, 1948, JP-A-1-142658 or JP-A-1-221461. Further, the organic solvent used for the reaction is preferably selected from solvents which are inert to the reaction and have a high boiling point, such as α-chloronaphthalene, β-chloronaphthalene, α-methylnaphthalene, methoxynaphthalene, diphenylnaphthalene, ethylene glycol dialkyl ether, quinoline, sulfolane, dichlorobenzene, N-methyl-2-pyrrolidone and dichlorotoluene.

TiOPc obtained by the above method is purified with an acid, an alkali, acetone, methanol, ethanol, methyl ethyl ketone, tetrahydrofuran, pyridine, quinoline, sulfolane, α-chloronaphthalene, toluene, xylene, dioxane, chloroform, dichloroethane, N,N-dimethylformamide, N-methyl-2-pyrrolidone or water, whereby high-purity phthalocyanines for use in electrophotography can be obtained. The method for the above purification includes a washing method, a recrystallization method, an extraction method such as a Soxhlet extraction method, a thermal suspension method and a sublimation method. However, the purification method shall not be limited to these, and any purification method can be employed so long as unreacted materials and by-products can be removed.

Amorphous TiOPc used in the present invention is preferably obtained by an acid pasting method. The acid pasting method refers to a method in which TiOPc is dissolved in a strong acid such as sulfuric acid and the resultant solution is poured into a poor solvent such as water to form particles. A precipitated crystal is preferably washed with water or a mixture of water with an organic solvent. The organic solvent includes alcohol solvents such as methanol, ethanol and isopropyl alcohol, ketone solvents such as acetone, methyl ethyl ketone and methyl isobutyl ketone, ester solvents such as ethyl formate, ethyl acetate and n-butyl acetate, and ether solvents such as diethyl ether, dimethoxyethane, tetrahydrofuran, dioxolane and anisole, while the organic solvent shall not be limited to these. TiOPc before the formation of amorphous TiOPc may have any crystal form.

In the crystal transformation of TiOPc, the amount ratio of TiOPc and water is as below. When the amount of TiOPc is 1 part by weight, the amount of water is preferably in the range of from 2 to 100 parts by weight. However, the amount ratio of TiOPc and water shall not be limited to the above range so long as TiOPC can be dispersed in water. Similarly, the amount of naphthalene per 100 parts by weight of TiOPc is in the range of from 10 to 5,000 parts by weight, more preferably in the range of from 50 to 500 parts by weight.

The naphthalene can be used in combination with a saturated hydrocarbon solvent. Specific examples of the saturated hydrocarbon solvent that can be used in combination include n-paraffins such as n-pentane and n-octane, isoparaffins such as 2-ethyl-hexane, and cycloparaffins such as cyclohexane, methylcyclohexane, ethylcyclohexane and decalin. When these saturated hydrocarbon solvents are used in combination with naphthalene, these saturated hydrocarbon solvents may be used alone or in combination.

In the crystal transformation in the presence of naphthalene and the above organic solvent, the amount of the organic solvent per 100 parts by weight of naphthalene is preferably 1,000 parts by weight or less, more preferably 200 parts by weight or less.

Amorphous TiOPc is subjected to crystal transformation to an intended crystal form in the presence of these solvent. The temperature for the crystal transformation is preferably from 80° C. to 95° C. When the above temperature is lower than 80° C., it is difficult to obtain an intended crystal form. When it exceeds 95° C., a transition to a β-form is liable to take place. It is therefore preferred to use a saturated hydrocarbon solvent having a boiling point of 80° C. or higher. Further, for carrying out the crystal transformation, the above temperature range is required to be reached at a point of time when the amorphous TiOPc, water and naphthalene are mixed.

Preferably, the above crystal transformation is carried out with stirring. The stirring can be carried out by a method using a stirrer, a ball mill, a paint conditioner, a sand mill, an attriter, a disperser or ultrasonic dispersion, while the stirring method shall not be limited to these so long as the stirring can be performed. The time period required for the transition is preferably 5 seconds to 120 hours, more preferably 10 seconds to 50 hours, still more preferably at 1 minute to 50 hours.

In some cases, a surfactant may be added. The surfactant can be any surfactant that is selected from cationic, nonionic or anionic surfactants. The amount of the surfactant per 100 parts by weight of TiOPc is preferably 0.001 to 50 parts by weight, more preferably 0.5 to 5 parts by weight.

Figure 20:
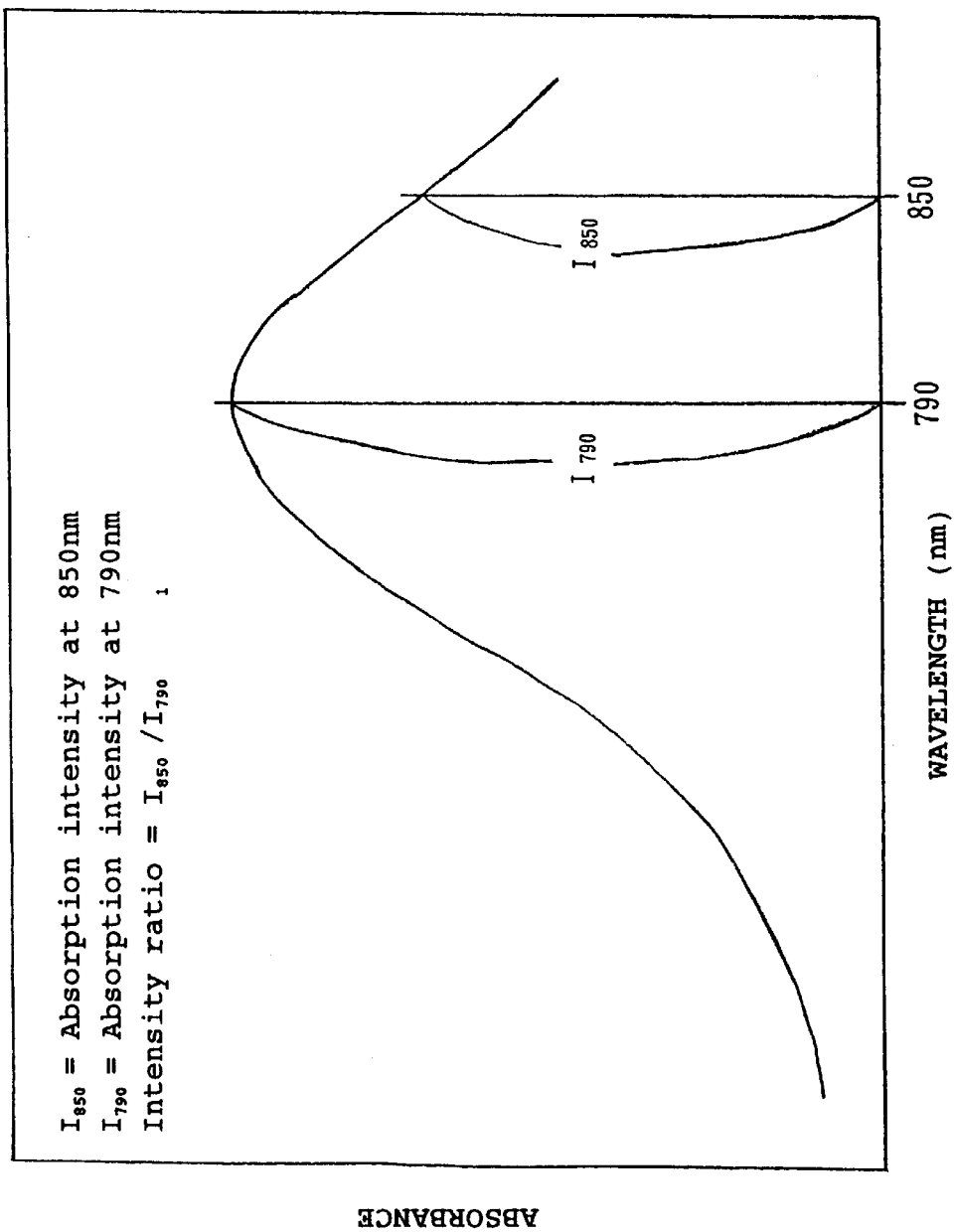
FIG. 20 is a schematic drawing for determining the absorption intensity ratio in the present invention.

In the present invention, the absorption intensity is determined as follows. An absorbance=0 in a specific wavelength is taken as a base line, and a height from the base line to a peak is taken as an absorption intensity (see FIG. 20). An absorption intensity ratio is determined by $I_{850}/I_{790}$ in which $I_{850}$ is an absorption intensity at 850 nm and $I_{790}$ is an absorption intensity at 790 nm.

In the present invention, the absorption intensity ratio $I_{850}/I_{790}$ is preferably at least 0.6, more preferably at least 0.8. That is because a semiconductor laser used as a light source has an oscillation wavelength of 780 to 830 nm so that a photoreceptor suitable therefor is required to have an absorption in a wider range of 760 to 850 nm.

The electrophotographic photoreceptor of the present invention can have any form. For example, it may be a photoreceptor in which a photosensitive layer comprising a charge-generating material, a charge-transporting material and a film-forming binder resin is formed on an electrically conductive support. Further, it may be a multilayer photoreceptor in which a charge-generating layer comprising a charge-generating material and a binder resin and a charge-transporting layer comprising a charge-transporting material and a binder resin are formed on an electrically conductive support. The charge-generating layer can be a top layer, or the charge-transporting layer can be a top layer. Further, an undercoat layer may be provided between the electrically conductive support and the photosensitive layer, or an overcoat layer may be formed on the photosensitive layer surface, as required. In the multilayer photoreceptor, an intermediate layer may be provided between the charge-generating layer and the charge-transporting layer. The support for the production of the photoreceptor of the present invention can be selected from a metal drum, a metal plate, or a sheet-shaped, drum-shaped or belt-shaped support of paper or a plastic film which is treated to have electrical conductivity.

As the charge-generating material in the electrophotographic photoreceptor of the present invention, there is used the TiOPc of the present invention having peaks at Bragg angles (2θ±0.2°), to X-ray at CuKα 1.541 Å, of 9.5°, 13.5°, 14.2°, 18.0°, 24.0° and 27.2°.

The novel TiOPc of the present invention may be used in combination with other charge-generating material. The other charge-generating material includes a triphenylmethane dye, a xanthene dye, an acridine dye, a thiazine dye, a pyrylium dye, an azulenium dye, a thiolylium dye, a cyanine dye, a squarilium dye, a pyrrolopyrrole dye, a polycyclic quinone dye, a perylene dye, a perinone dye, an anthraquinone dye, a dioxadine dye, an azo pipment and phthalocyanines. When the above "other" charge-generating materials are used in combination with TiOPc, they are used alone or in combination.

In the electrophotographic photoreceptor of the present invention, the photosensitive layer may contain an additive. Specific examples of the additive of the formula (1) to (6) include additives having the structures of the following formula (7) to (46), although the additive shall not be limited to these.

(7) 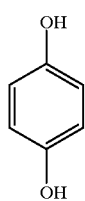
(8) 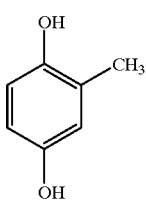
(9) 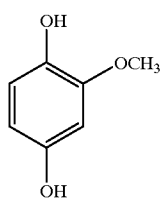
(10) 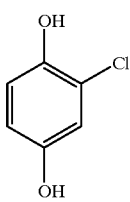
(11) 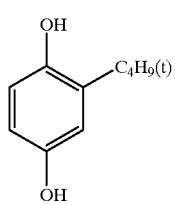
(12) 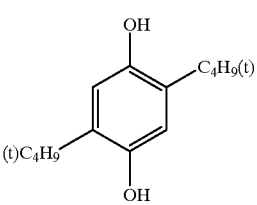
(13) 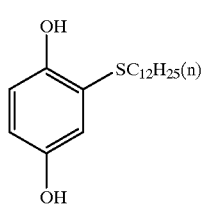
(14) 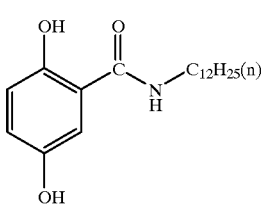
(15) 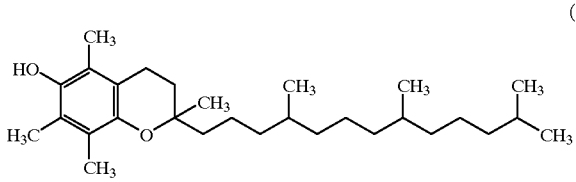
(16) 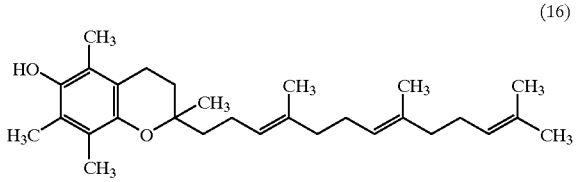
(17) 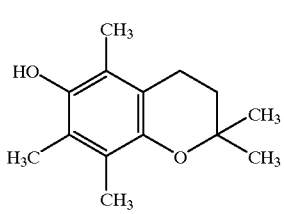
(18) 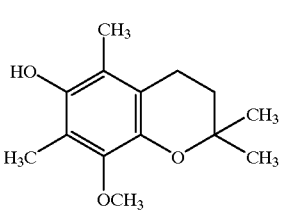
(19) 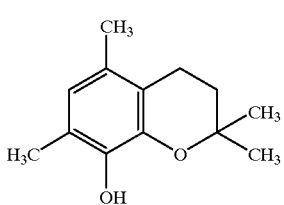
(20) 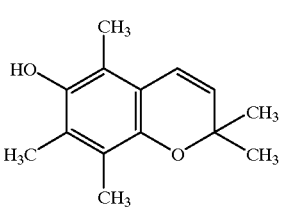

(21)
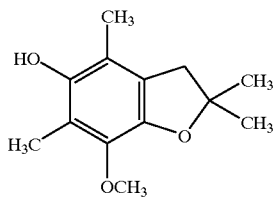
(22)
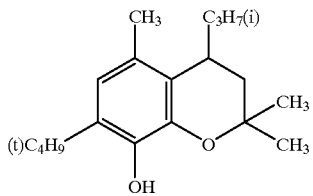
(23)
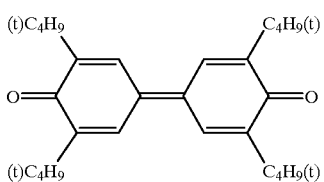
(24)
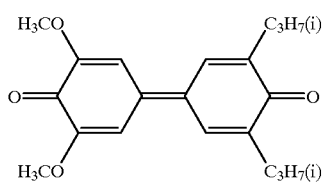
(25)
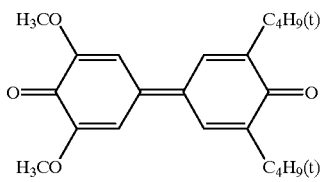
(26)
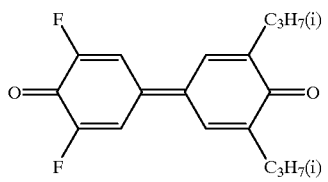
(27)
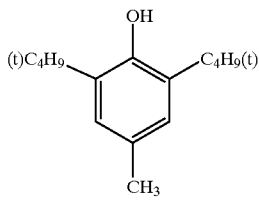
(28)
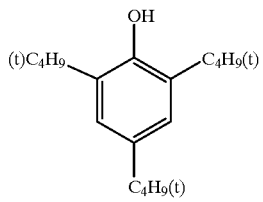
(29)
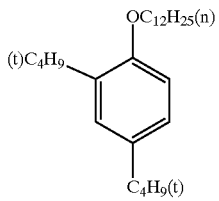
(30)
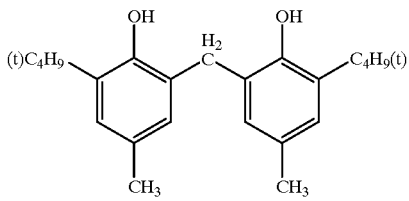
(31)
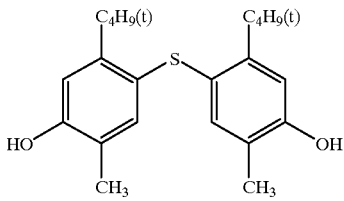
(32)
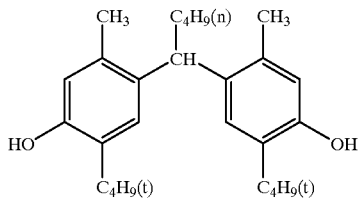
(33)
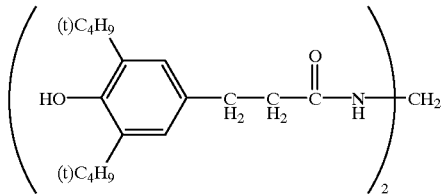
(34)
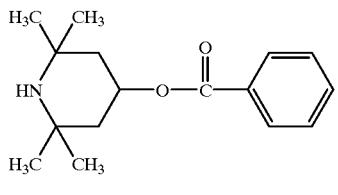

-continued
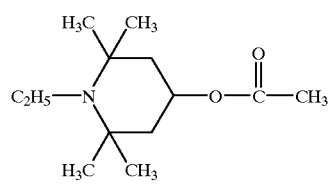 (35)
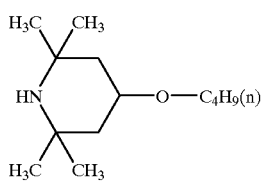 (36)
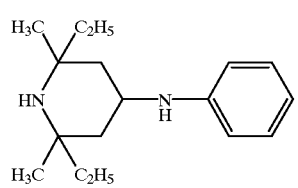 (37)
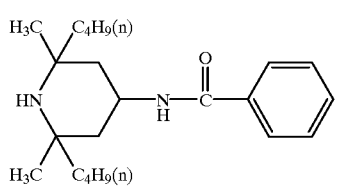 (38)
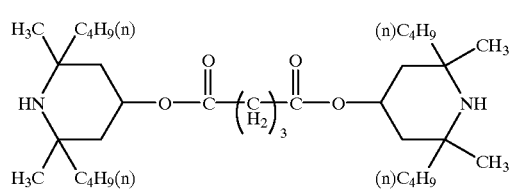 (39)
(40)
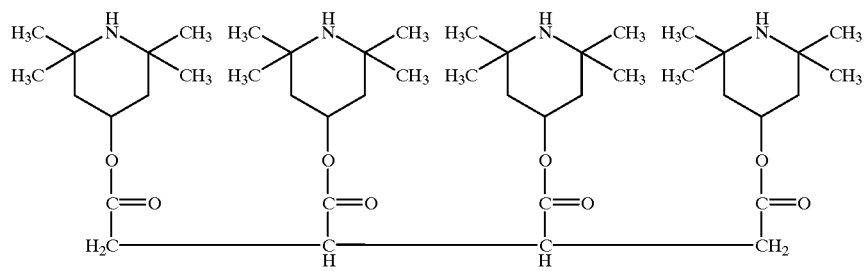
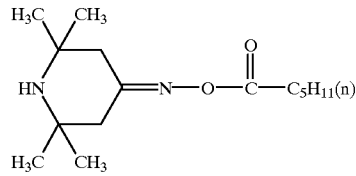 (41)
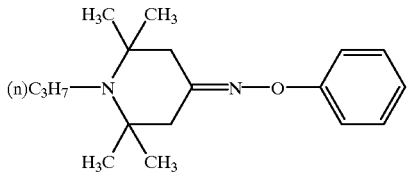 (42)
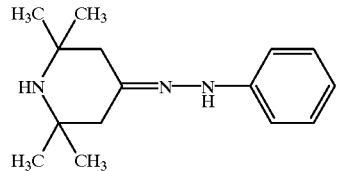 (43)
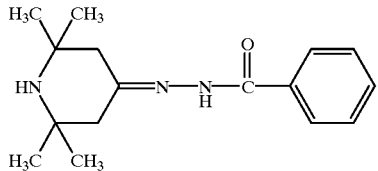 (44)
(45)
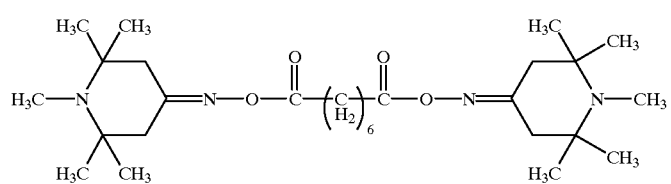

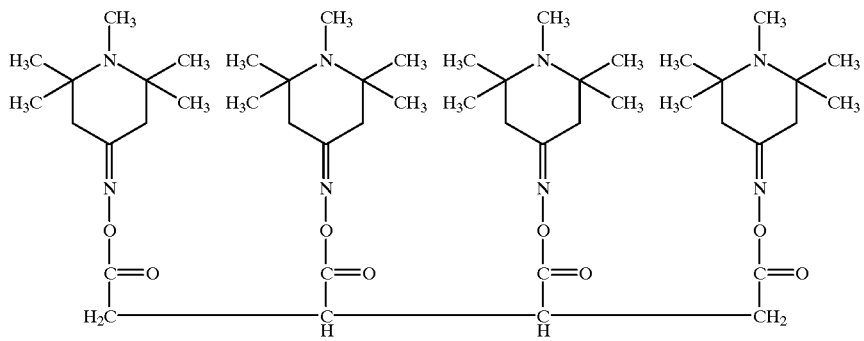

(46)

The film-forming binder resin used for forming the photosensitive layer of the electrophotographic photoreceptor of the present invention includes various binder resins depending upon the fields of use of the photoreceptor. Examples of the film-forming binder resin used for forming a photoreceptor for a copying machine include a polystyrene resin, a polyvinyl acetal resin, a polysulfone resin, a polycarbonate resin, a vinyl acetate-crotonic acid copolymer resin, a polyester resin, a polyphenylene oxide resin, a polyallyrate resin, an alkyd resin, an acrylic resin, a methacrylic resin, a phenoxy resin and a polyvinyl chloride resin. Of these resins, a polystyrene resin, a polyvinyl acetal resin, a polycarbonate resin, a polyester resin and a polyarylate resin are excellent for potential characteristics of the photoreceptor. The above resins may be homopolymers or copolymers, and they may be used alone or in combination.

The amount of the binder resin based on TiOPc is preferably 10 to 500% by weight, more preferably 50 to 150% by weight. When the amount of the resin is too large, the charge generation efficiency decreases. When it is too small, there is caused a problem on the film formability.

Some of the above binder resins are poor in mechanical strength such as tensile strength, flexural strength or compression strength. For improving these properties, a substance for imparting plasticity may be added. Specific examples of the substance for imparting plasticity include phthalate esters (e.g., DOP and DBP), phosphate esters (e.g., TCP and TOP), cebacate ester, adipate ester, nitrile rubber and chlorinated hydrocarbon. These substances may have an adverse effect on electrophotographic properties when added in an amount more than necessary. The amount of the above substance per 100 parts by weight of the binder is preferably 20 parts by weight or less.

Further, an antioxidant and a curling-preventing agent as an additive to be added for forming the photoreceptor and a leveling agent for improving coatability may be added as required.

The charge-transporting material for use in the photoreceptor of the present invention includes a hole-transporting material and an electron-transporting material. Examples of the former include oxadiazoles disclosed in JP-B-34-5466, triphenylmethanes disclosed in JP-B-45-555, pyrazolines disclosed in JP-B-52-4188, hydrozones disclosed in JP-B-55-42380, oxadiazoles disclosed in JP-A-56-123544, tetraarylbenzidines disclosed in JP-A-54-58445, and stilbenes disclosed in JP-A-58-65440 and JP-A-60-98437. Above all, the charge-transporting material for use in the present invention is particularly preferably selected from hydrazones disclosed in JP-A-60-24553, JP-A-2-96767, JP-A-2-183260 and JP-A-2-226160 and stilbenes disclosed in JP-A-2-51162 and JP-A-3-75660. The above materials may be used alone or in combination.

Examples of the electron-transporting material include chloranil, tetracyanoethylene, tetracyanoquinodimethane, 2,4,7-trinitro-9-fluorenone, 2,4,5,7-tetranitro-9-fluorenone, 2,4,5,7-tetranitroxanthone, 2,4,8-trinitrothioxanthone, 1,3,7-trinitrodibenzothiophene and 1,3,7-trinitrodibenzothiophene-5,5-dioxide. These electron-transporting materials may be used alone or in combination.

As a sensitizer for intensifying the sensitivity-increasing effect, further, an electron acceptor may be added. Examples of the electron acceptor include quinones such as 2,3-dichloro-1,4-naphthoquinone, 1-nitroanthraquinone, 1-chloro-5-nitroanthraquinone, 2-chloroanthraquinone and phenanthrenequinone, aldehydes such as 4-nitrobenzaldehyde, ketones such as 9-benzoylanthracene, indandione, 3,5-dinitrobenzophenone and 3,3',5,5'-tetranitrobenzophenone, acid anhydrides such as phthalic anhydride, 4-chloronaphthalic anhydride, cyano compounds such as terephthalalmalononitrile, 9-anthrylmethylidene-malononitrile, 4-nitrobenzalmalononitrile and 4-(p-nitrobenzoyloxy)banzalmalononitrile, and phthalides such as 3-banzal phthalide, 3-(α-cyano-p-nitrobenzal)phthalide and 3-(α-cyano-p-nitrobanzal)-4,5,6,7-tetrachlorophthalide.

The amount of the above binder contained in the charge-transporting layer, based on 1 part by weight of the charge-transporting material, is preferably 0.001 to 20 parts by weight, more preferably 0.01 to 5 parts by weight. When the amount of the binder is too large, the sensitivity decreases. When the amount of the binder is too small, the stability in repeated use may be downgraded, or a coating may be defective.

The electrophotographic photoreceptor of the present invention can be produced by dissolving or dispersing in a solvent the above various substances selected depending upon a form of the photoreceptor, to prepare a coating solution, applying the coating solution onto the above-explained electrically conductive support and drying a formed coating. The solvent suitable for preparing the coating solution includes water, alcohol solvents such as methanol, ethanol and isopropyl alcohol, ketone solvents such as acetone, methyl ethyl ketone and methyl isobutyl ketone, ester solvents such as ethyl formate, ethyl acetate and n-butyl acetate, ether solvents such as diethyl ether, dimethoxyethane, tetrahydrofuran, dioxolane, dioxane and anisole, amide solvents such as N,N-dimethylformamide, N,N-dmethylacetamide and N-methyl-2-pyrrolidone, halogenated hydrocarbon solvents such as dichloromethane, chloroform, bromoform, methyl iodide, dichloroethane, trichloroethane, trichloroethylene, chlorobenzene, o-dichlorobenzene, fluorobenzene, bromobenzene, iodobenzene and α-chloronaphthalene, and hydrocarbon solvents such as n-pentane, n-hexane, n-octane, 1,5-hexadiene, cyclohexane, methylcyclohexane, cyclohexadiene, benzene, toluene, o-xylene, m-xylene, p-xylene, ethylbenzene and cumene. of these, ketone solvents, ester solvents, ether solvents or halogenated hydrocarbon solvents are preferred. These solvents are used alone or in combination.

EXAMPLES

The present invention will be explained more in detail with reference to Examples hereinafter, while the present invention shall not be limited to these Examples.

Synthesis Example 1

20.0 Grams of phthalodinitrile was dissolved in 200 ml of α-chloronaphthalene, and under a nitrogen atmosphere, 9.0 g of titanium tetrachloride was dropwise added. After the addition, the resultant mixture was stirred under heat at 240° C. After 3 hours, the reaction was terminated, and a precipitated crystal was recovered by filtration and fully washed with α-chloronaphthalene and with methanol, to give dichlorotitanylphthalocyanine. The dichlorotitanylphthalocyanine and 150 ml of concentrated aqueous ammonia were together refluxed under heat. After 1 hour, the reaction was terminated, and a crystal was collected by filtration, to give 17.4 g of TiOPc. The obtained crystal was determined for its crystal form by measuring it for an X-ray diffraction spectrum using CuKα ray with an X-ray diffractometer (RAD-C system manufactured by Rigaku Denki K.K.). FIG. 1 shows the measurement results.

| Measurement conditions | |
| --- | --- |
| X-ray tube sphere: | Cu |
| Voltage: | 40.0 KV |
| Current: | 100.0 mA |
| Start angle: | 3.0 deg. |
| Stop angle: | 40.0 deg. |
| Step angle: | 0.02 deg. |

Synthesis Example 2

Figure 2:
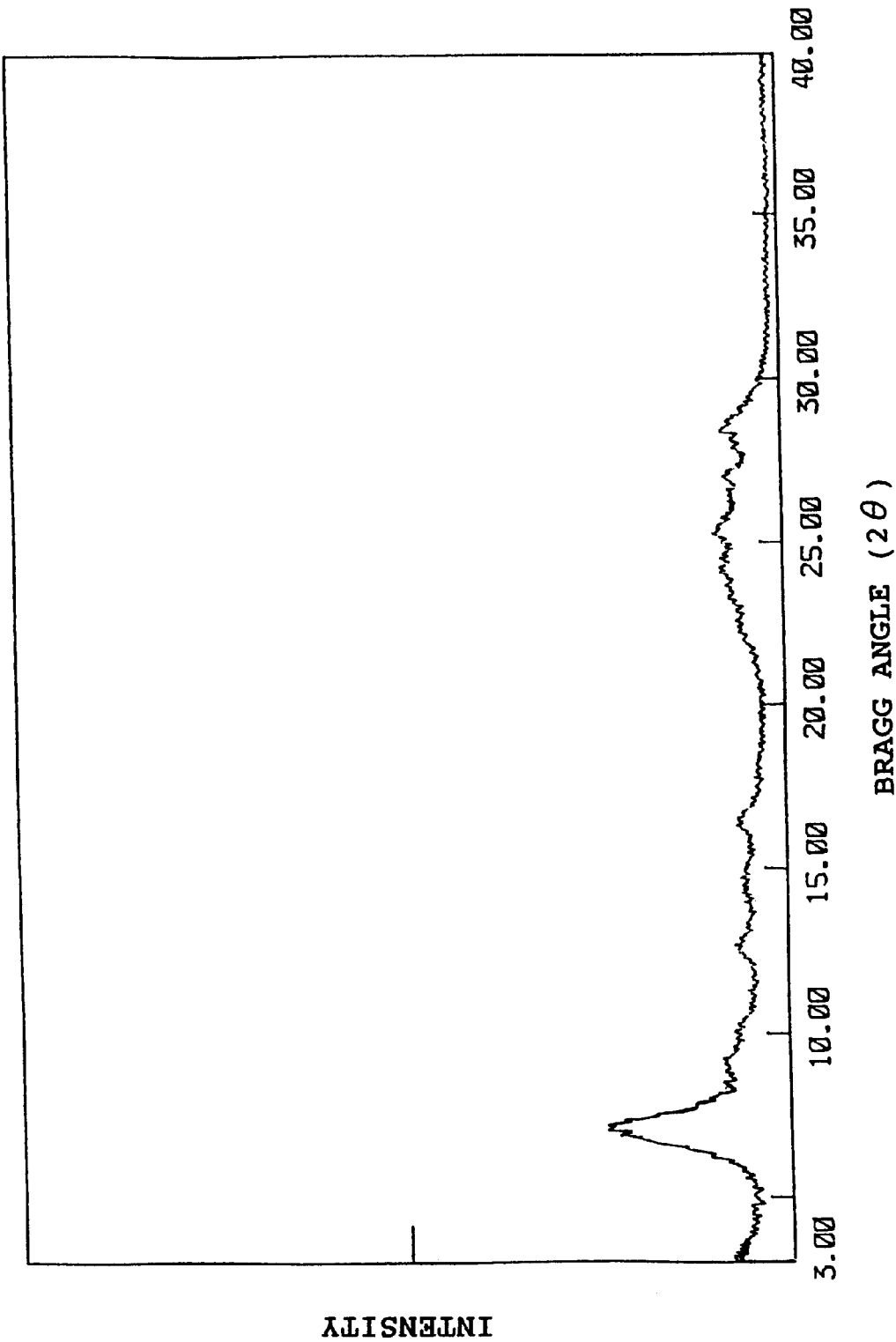
FIG. 2 shows an X-ray diffraction spectrum of TiOPc obtained in Synthesis Example 2.

3.0 Grams of the TiOPc obtained in Synthesis Example 1 was gradually added to, and dissolved in, 30 ml of concentrated sulfuric acid cooled to approximately 2° C. The resultant solution was gradually poured into 300 ml of cooled ice water, to precipitate a crystal. The crystal was collected by filtration and was washed with water until it showed a neutrality, to give 2.7 g of a crystal. FIG. 2 shows an X-ray spectrum of the crystal. FIG. 2 shows that the crystal was in an amorphous state where a crystal was disarranged.

Synthesis Example 3

Figure 3:
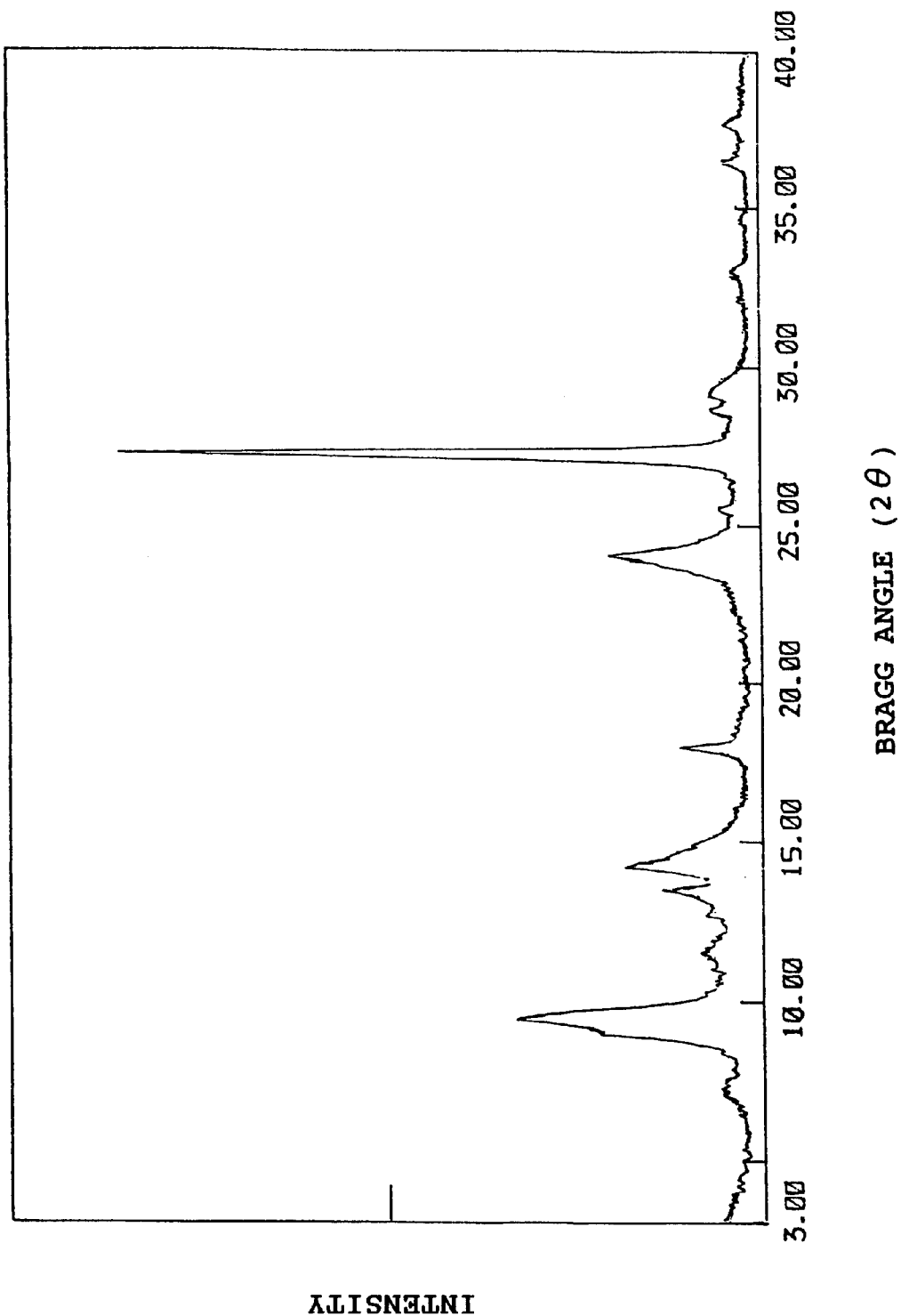
FIG. 3 shows an X-ray diffraction spectrum of TiOPc obtained in Synthesis Example 3.
Figure 4:
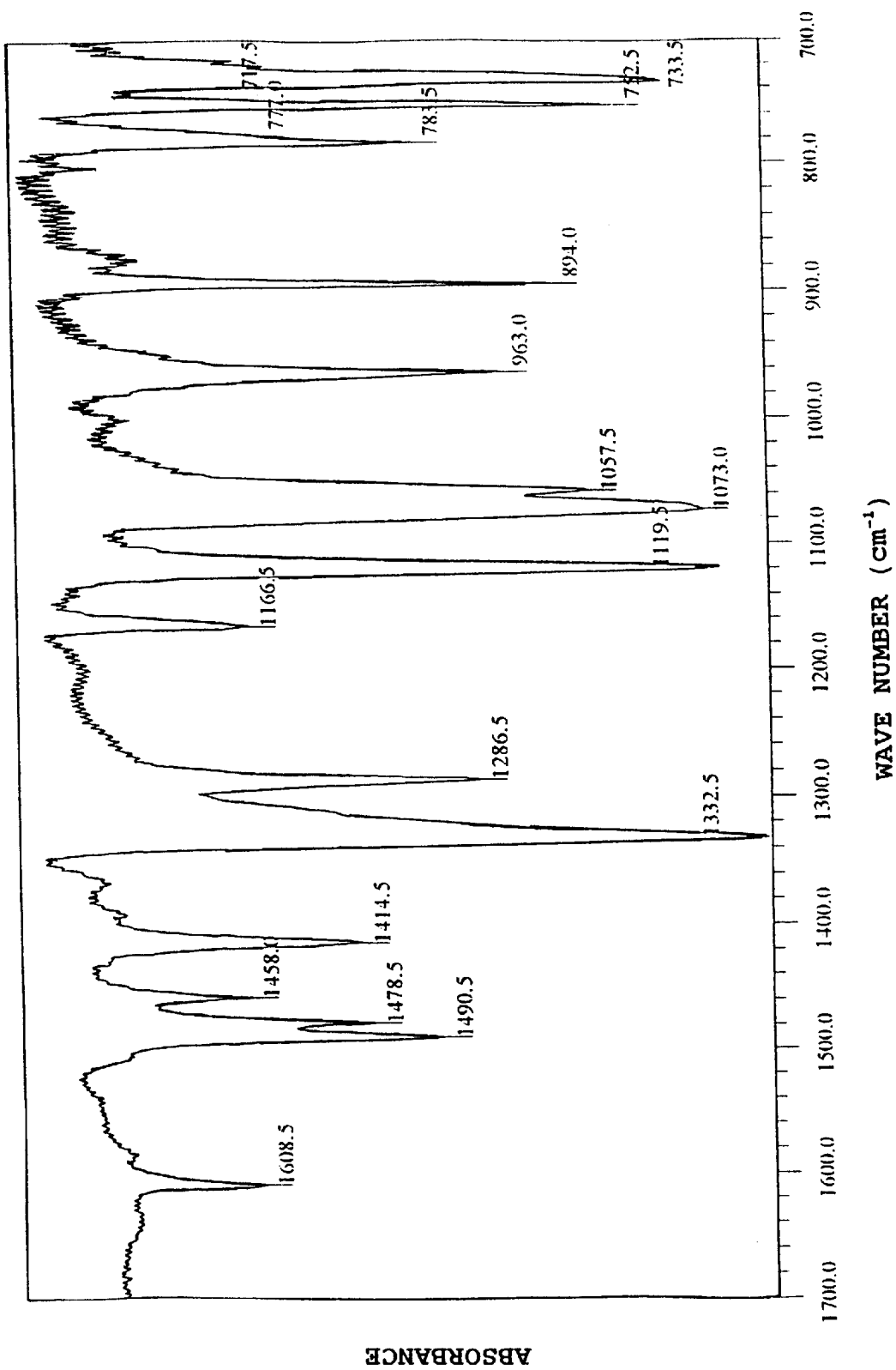
FIG. 4 shows an infrared absorption spectrum of TiOPc obtained in Synthesis Example 3.

1.0 Gram of the amorphous TiOPc obtained in Synthesis Example 2 and 28.0 g of water were placed in a 100-ml flask, and stirred under heat at 85° C. After 10 minutes, 2.0 g of naphthalene was added, and then, the mixture was stirred under heat at the above temperature. After 1 hour, the reaction was terminated, and the reaction mixture was allowed to cool to room temperature. A crystal was collected by filtration and washed with methanol, to give 0.9 g of a crystal. The obtained crystal was measured for an X-ray diffraction spectrum and an infrared absorption spectrum with an FT-IR spectrometer (1760X, manufactured by Perkin-Elmer Ltd.). FIG. 3 shows results of the X-ray diffraction spectrum, and FIG. 4 shows results of the infrared absorption spectrum. It is seen from FIG. 3 that the obtained crystal form had intense peaks different from noise, at Bragg angles (2θ±0.2°) of 9.5°, 13.5°, 14.2°, 18.0°, 24.0° and 27.2° alone. It is seen from FIG. 4 that the above crystal form had an intense peak at 733.5 $cm^{-1}$.

Synthesis Example 4

Crystal transformation was carried out in the same manner as Synthesis Example 3 except that the heating temperature in Synthesis Example 3 was changed from 85° C. to 95° C. As a result, 0.9 g of a crystal was obtained. The X-ray diffraction spectrum of the obtained crystal form was the same as that shown in FIG. 3.

Synthesis Example 5

Figure 5:
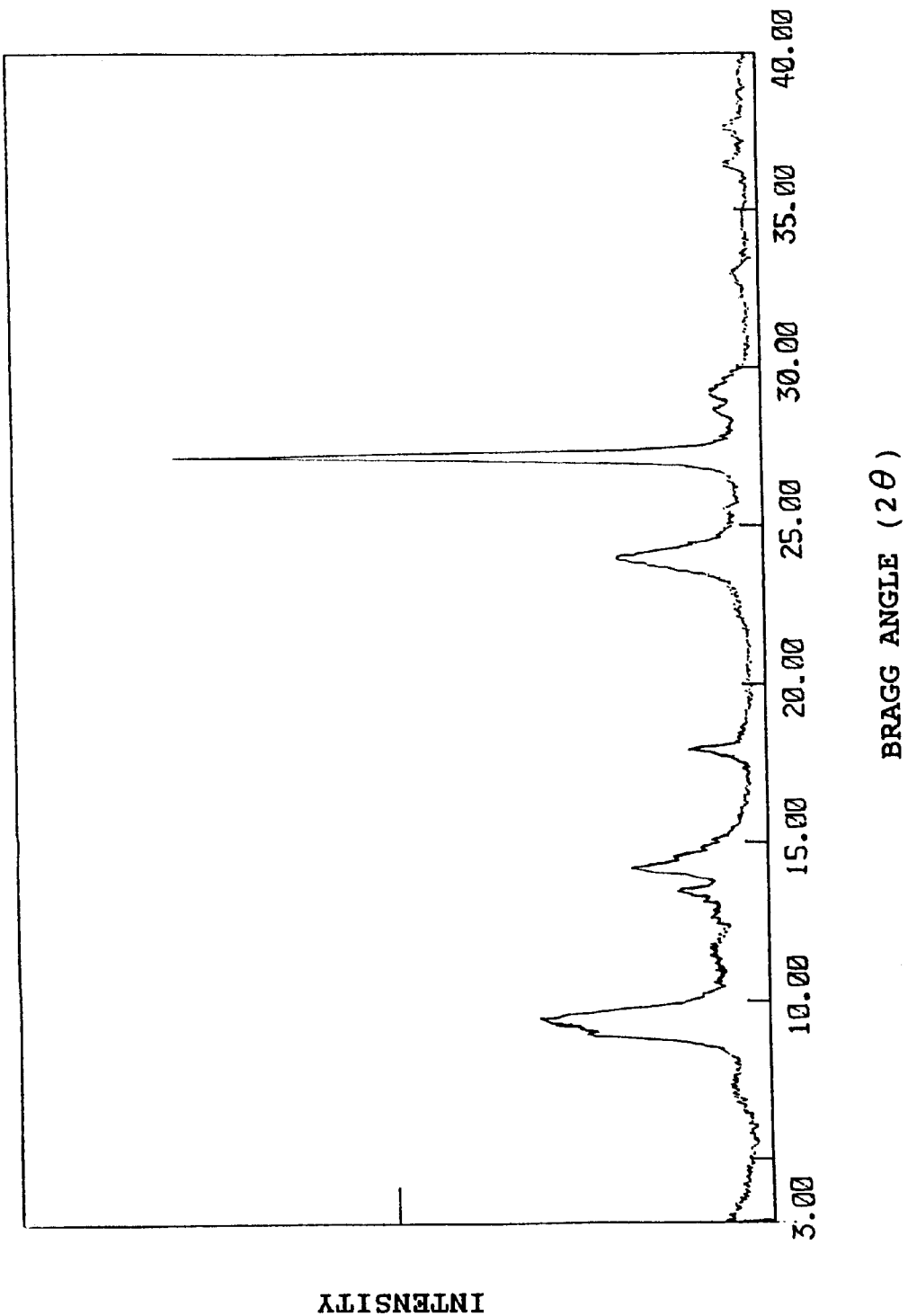
FIG. 5 shows an X-ray diffraction spectrum of TiOPc obtained in Synthesis Example 5.

Crystal transformation was carried out in the same manner as in Synthesis Example 3 except that 2.0 g of the naphthalene was replaced with a mixture of 1.0 g of naphthalene with 1.0 g of octane. As a result, 0.9 g of a crystal was obtained. FIG. 5 shows an X-ray diffraction spectrum of the obtained crystal form. It is seen from FIG. 5 that the obtained crystal form was the same as that shown in FIG. 3.

Synthesis Example 6

Figure 6:
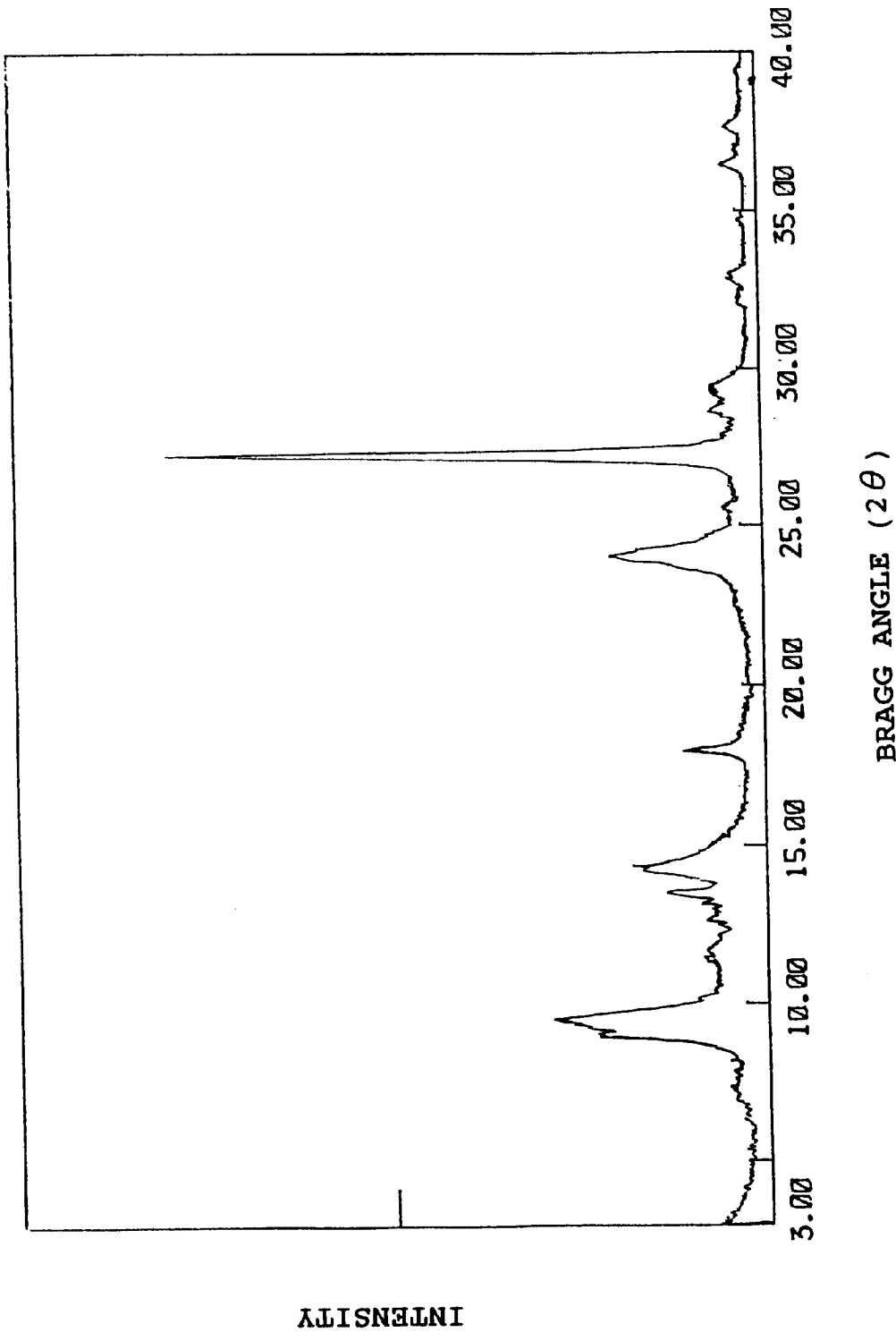
FIG. 6 shows an X-ray diffraction spectrum of TiOPc obtained in Synthesis Example 6.

Crystal transformation was carried out in the same manner as in Synthesis Example 3 except that 2.0 g of the naphthalene was replaced with a mixture of 1.0 g of naphthalene with 1.0 g of terpinolene. As a result, 0.9 g of a crystal was obtained. FIG. 6 shows an X-ray diffraction spectrum of the obtained crystal form. It is seen from FIG. 6 that the obtained crystal form was the same as that shown in FIG. 3.

Synthesis Example 7

Figure 7:
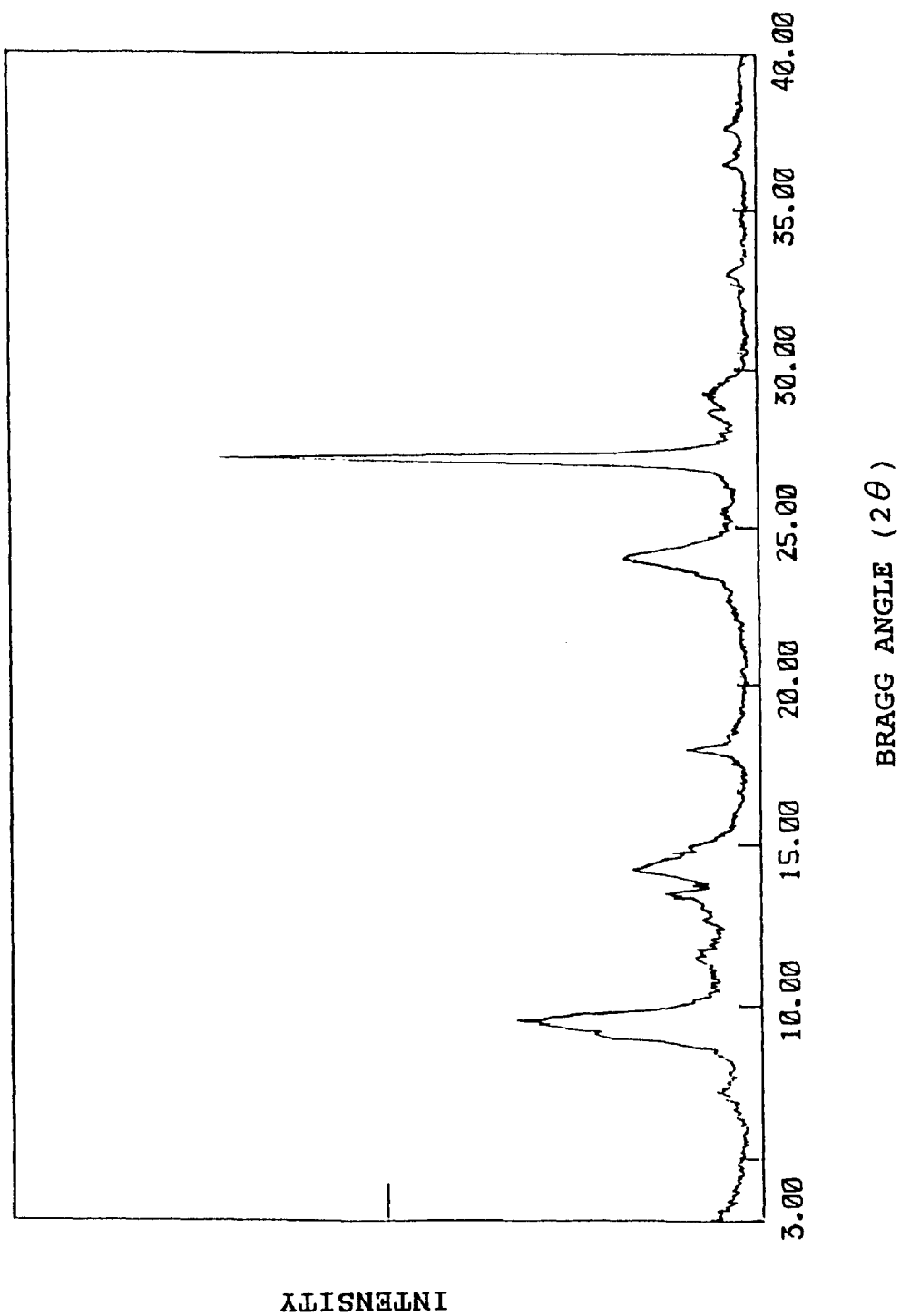
FIG. 7 shows an X-ray diffraction spectrum of TiOPc obtained in Synthesis Example 7.

Crystal transformation was carried out in the same manner as in Synthesis Example 3 except that 2.0 g of the naphthalene was replaced with a mixture of 1.0 g of naphthalene with 1.0 g of cyclohexanone. As a result, 0.9 g of a crystal was obtained. FIG. 7 shows an X-ray diffraction spectrum of the obtained crystal form. It is seen from FIG. 7 that the obtained crystal form was the same as that shown in FIG. 3.

Synthesis Example 8

Figure 8:
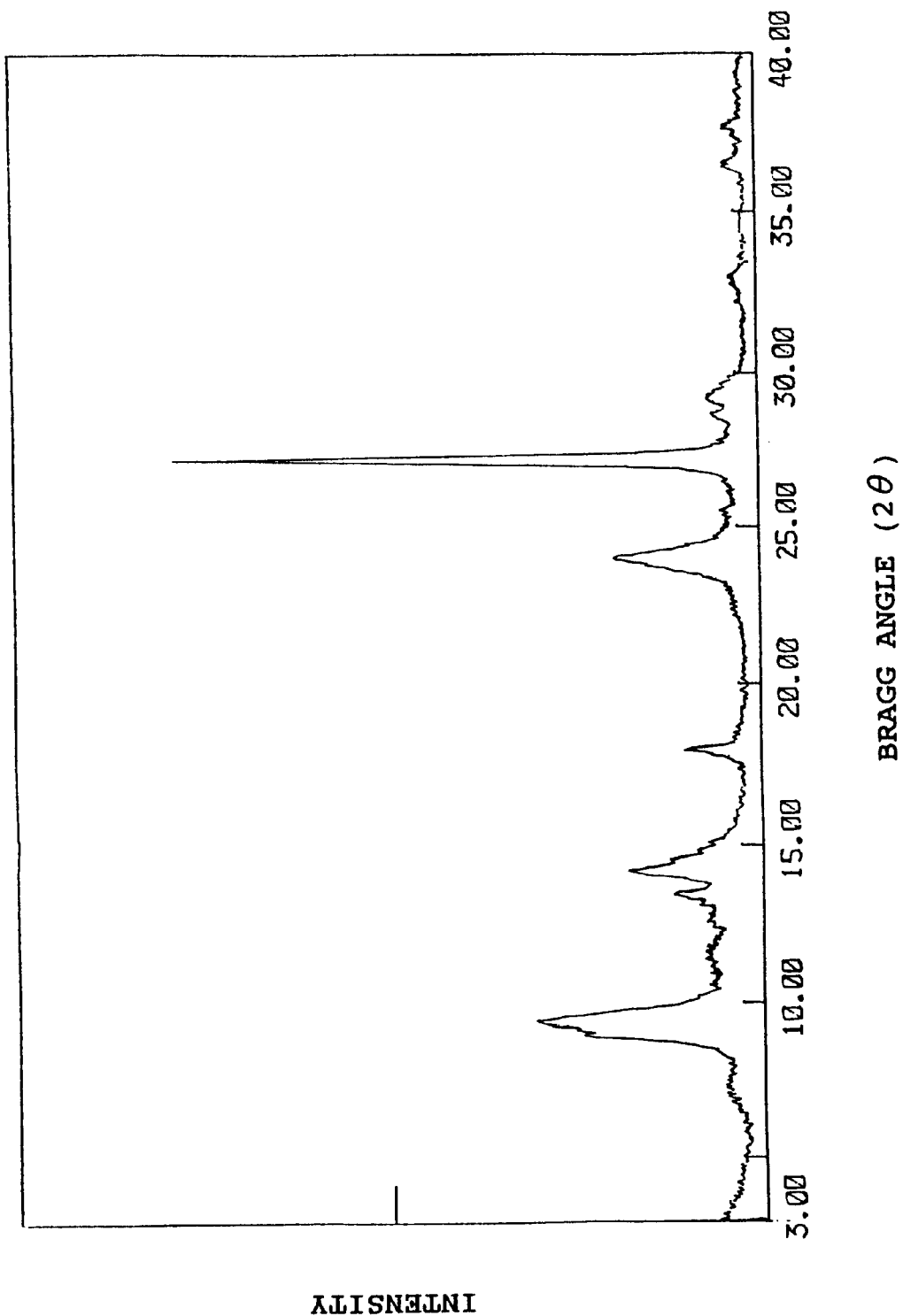
FIG. 8 shows an X-ray diffraction spectrum of TiOPc obtained in Synthesis Example 8.

Crystal transformation was carried out in the same manner as in Synthesis Example 3 except that 2.0 g of the naphthalene was replaced with a mixture of 1.0 g of naphthalene with 1.0 g of ethylcyclohexane. As a result, 0.9 g of a crystal was obtained. FIG. 8 shows an X-ray diffraction spectrum of the obtained crystal form. It is seen from FIG. 8 that the obtained crystal form was the same as that shown in FIG. 3.

Comparative Synthesis Example 1

Figure 9:
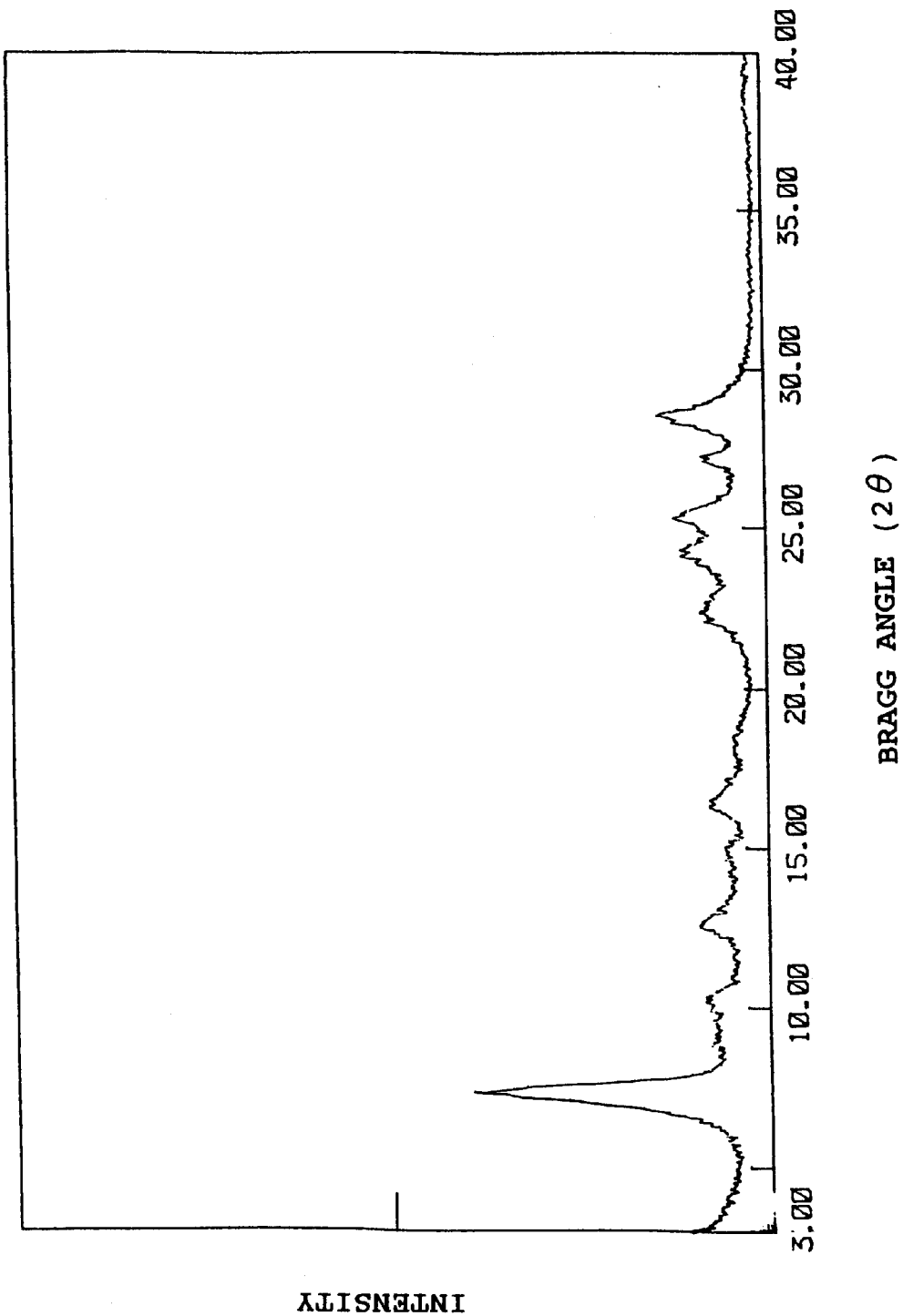
FIG. 9 shows an X-ray diffraction spectrum of TiOPc obtained in Comparative Synthesis Example 1.

Crystal transformation was carried out in the same manner as Synthesis Example 3 except that the heating temperature in Synthesis Example 3 was changed from 85° C. to 60° C. As a result, 0.9 g of a crystal was obtained. FIG. 9 shows an X-ray diffraction spectrum of the obtained crystal form.

Comparative Synthesis Example 2

Figure 10:
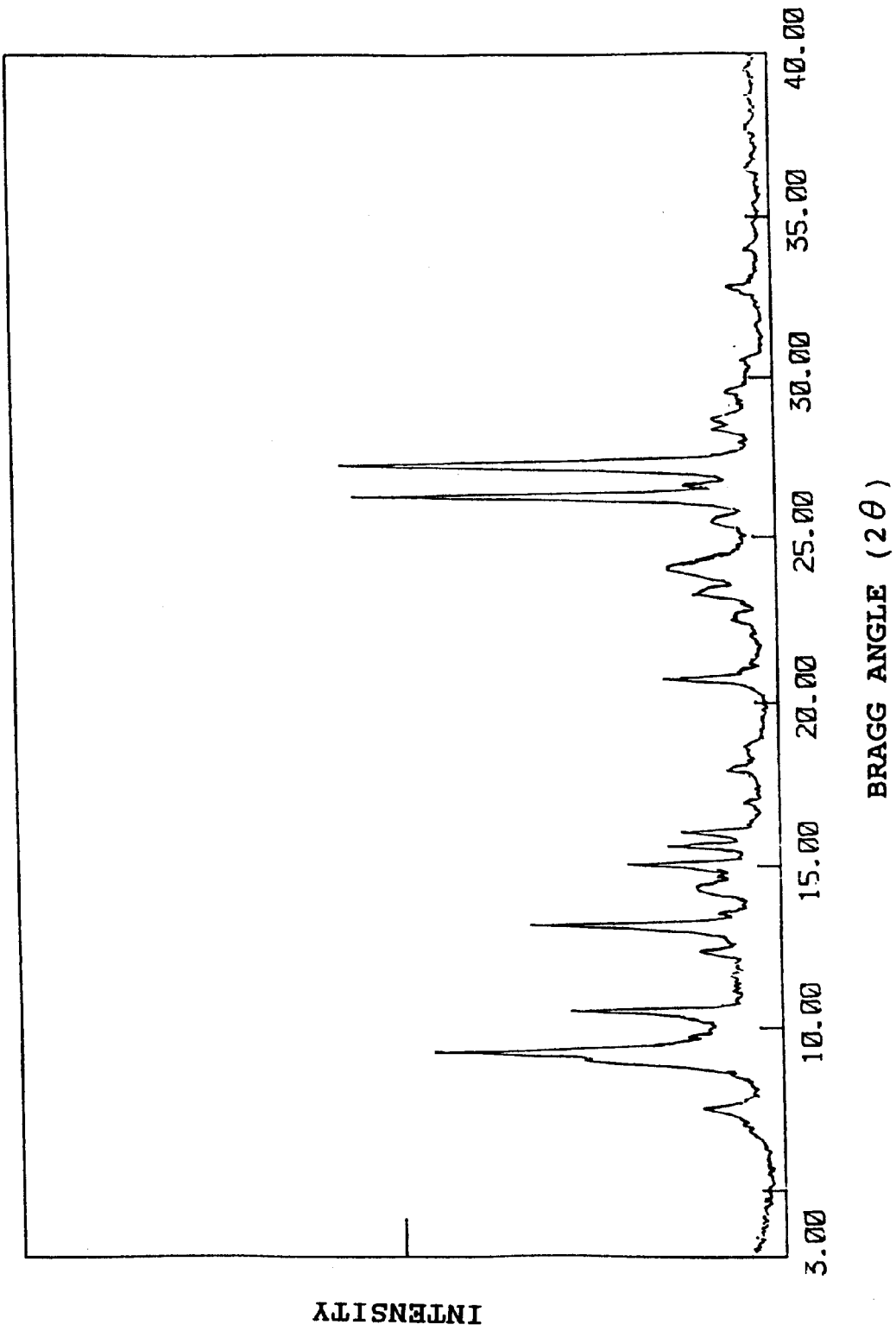
FIG. 10 shows an X-ray diffraction spectrum of TiOPc obtained in Comparative Synthesis Example 2.

Crystal transformation was carried out in the same manner as Synthesis Example 3 except that the heating temperature in Synthesis Example 3 was changed from 85° C. to 97° C. As a result, 0.9 g of a crystal was obtained. FIG. 10 shows an X-ray diffraction spectrum of the obtained crystal form.

Comparative Synthesis Example 3

TiOPc was obtained according to Synthesis Example described in JP-A-3-128973.

Figure 11:
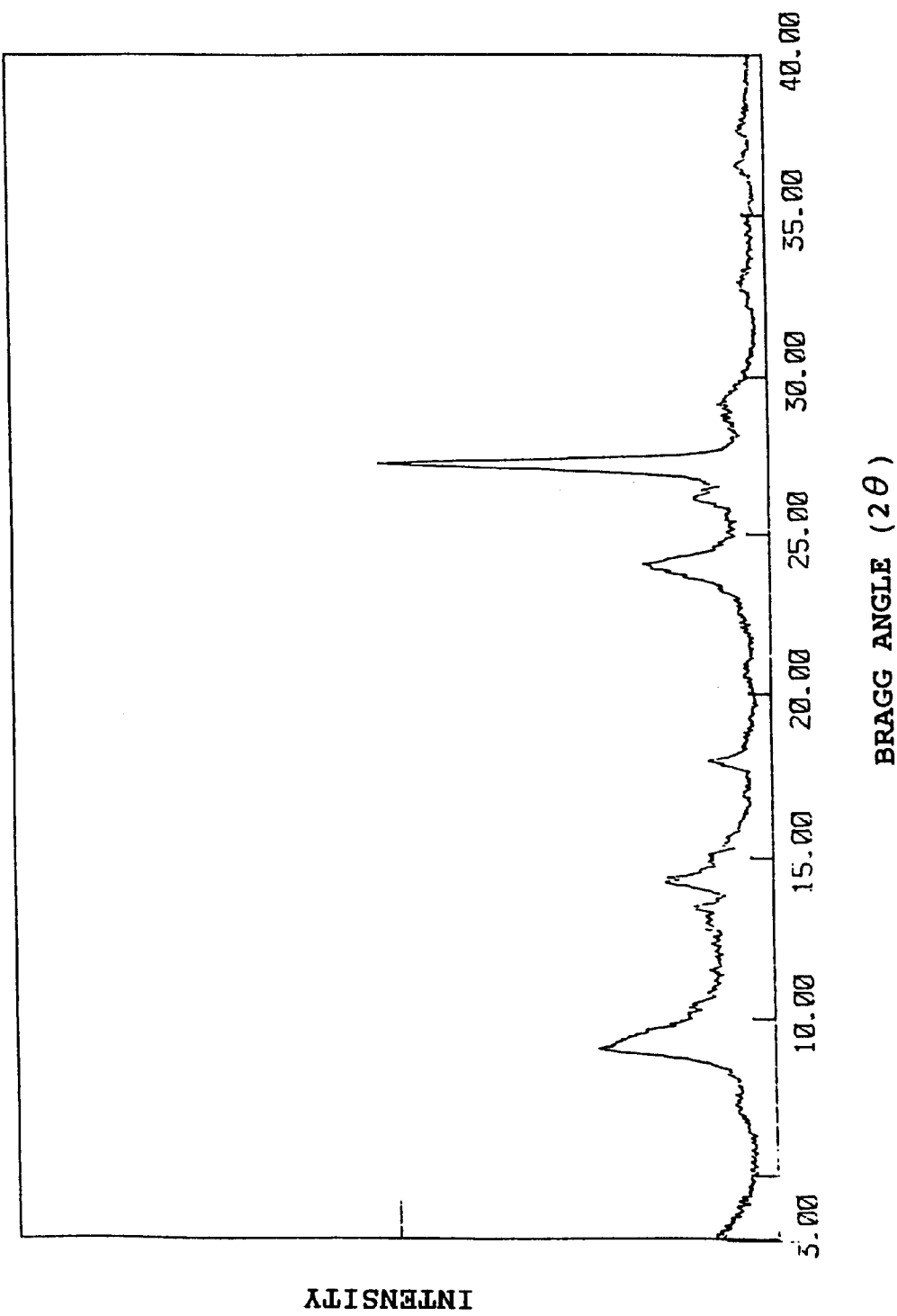
FIG. 11 shows an X-ray diffraction spectrum of TiOPc obtained in Comparative Synthesis Example 3.
Figure 12:
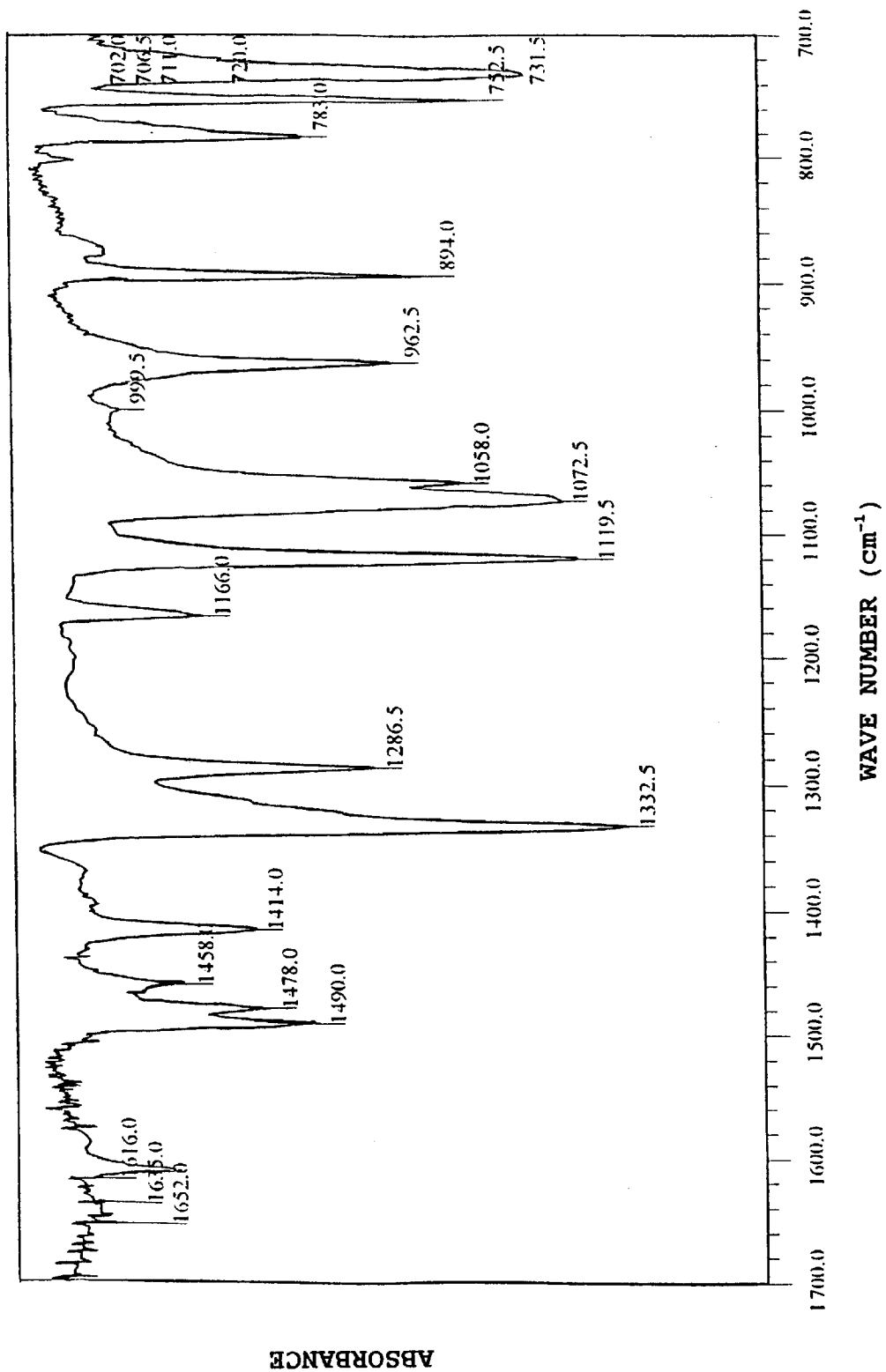
FIG. 12 shows an infrared absorption spectrum of TiOPc obtained in Comparative Synthesis Example 3.

4.0 Grams of the amorphous TiOPc obtained in Synthesis Example 2 and 100 ml of methanol were placed in a 200-ml flask, and the mixture was stirred at room temperature. After 14 hours, the stirring was terminated, and the mixture was filtered to give 3.9 g of a crystal. 2.0 Grams of the obtained crystal was milled together with 40 ml of n-butyl ether and 60 cc of glass beads with a paint conditioner (manufactured by Red Devil Inc.) for 8 hours. The glass beads were removed, and the solvent was removed to give 1.9 g of a crystal. The obtained crystal was measured for an X-ray diffraction spectrum and an infrared absorption spectrum. FIG. 11 shows results of the X-ray diffraction spectrum, and FIG. 12 shows results of the infrared absorption spectrum. It is seen from FIG. 11 that the obtained crystal form had peaks at Bragg angles ($2\theta \pm 0.2°$) of 9.0°, 14.2°, 23.90 and 27.1°. It is seen from FIG. 12 that the above crystal form had an intense peak at 731.5 cm$^{-1}$.

Comparative Synthesis Example 4

TiOPc was obtained according to Synthesis Example described in JP-A-63-20365.

Figure 13:
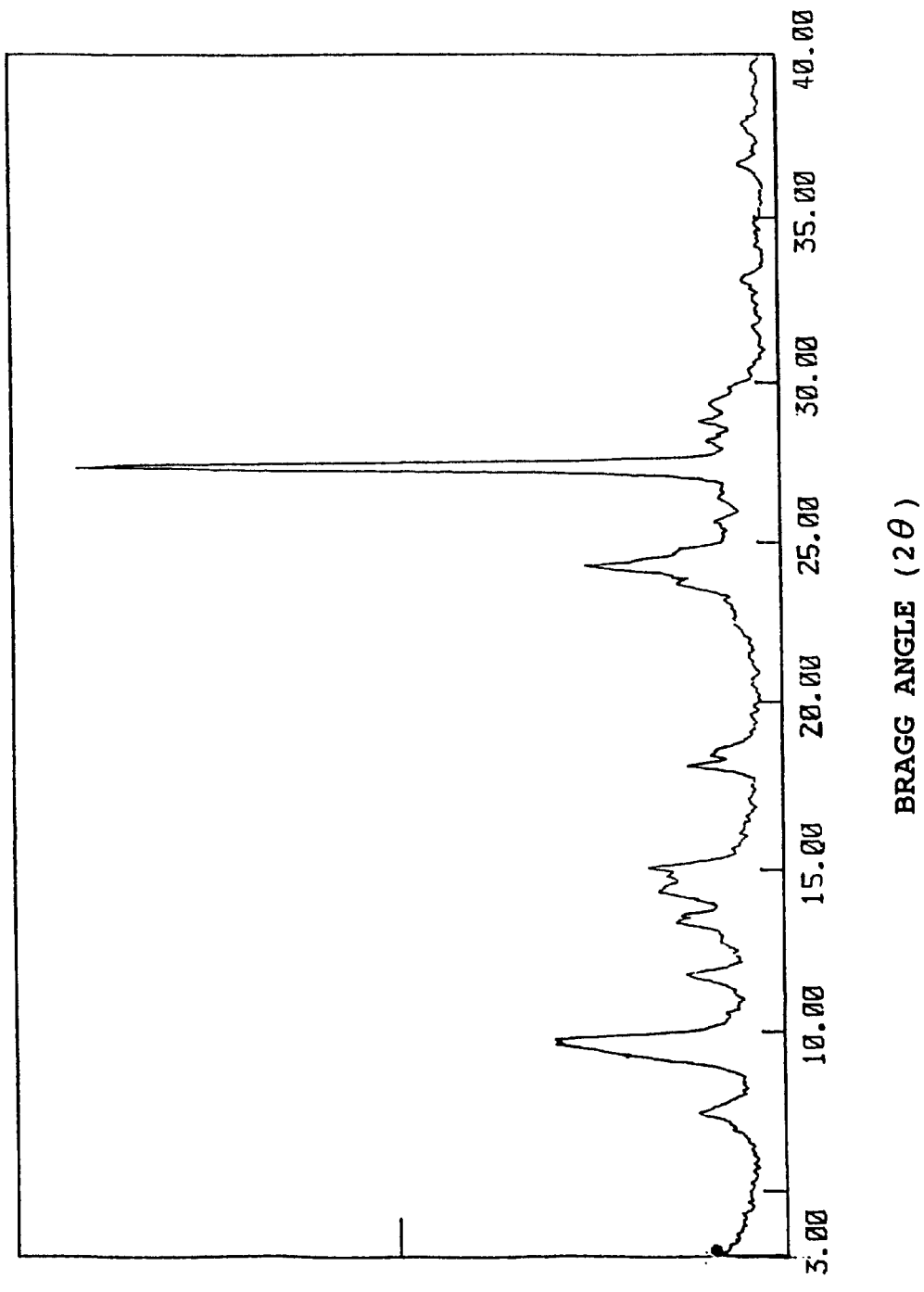
FIG. 13 shows an X-ray diffraction spectrum of TiOPc obtained in Comparative Synthesis Example 4.
Figure 14:
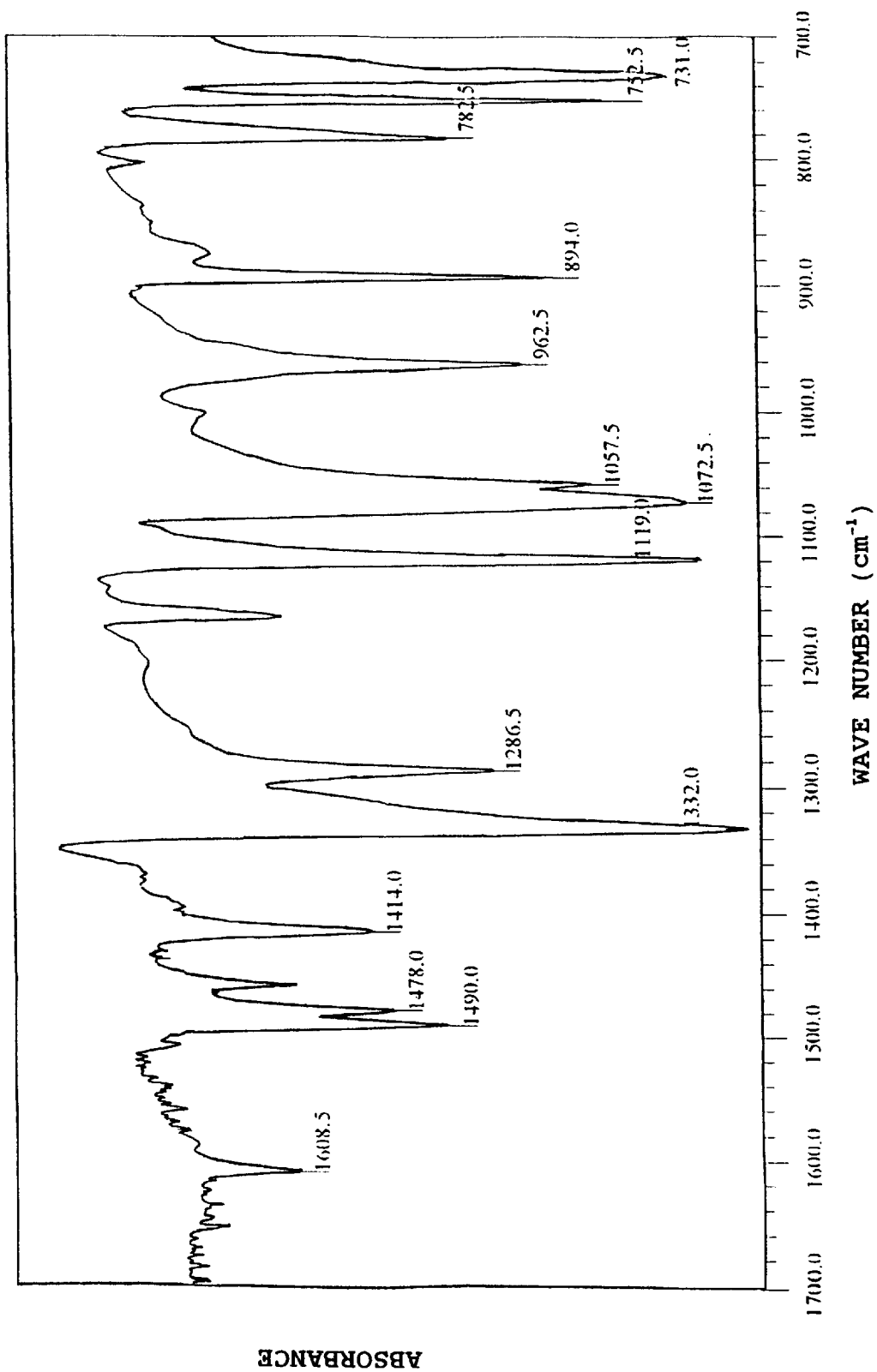
FIG. 14 shows an infrared absorption spectrum of TiOPc obtained in Comparative Synthesis Example 4.

Crystal transformation was carried out in the same manner as in Synthesis Example 3 except that 2.0 g of the naphthalene was replaced with 2.0 g of o-dichlorobenzene. As a result, 0.9 g of a crystal was obtained. The obtained crystal was measured for an X-ray diffraction spectrum and an infrared absorption spectrum. FIG. 13 shows results of the X-ray diffraction spectrum, and FIG. 14 shows results of the infrared absorption spectrum. It is seen from FIG. 13 that the obtained crystal form had peaks at Bragg angles ($2\theta \pm 0.2°$) of 9.5°, 9.7°, 11.7°, 15.0°, 23.5°, 24.1° and 27.3° or that it had peaks which are not observed in the TiOPc of the present invention. Further, it is seen from FIG. 14 that the above crystal form had an intense peak at 731.0 cm$^{-1}$.

Comparative Synthesis Example 5

Figure 15:
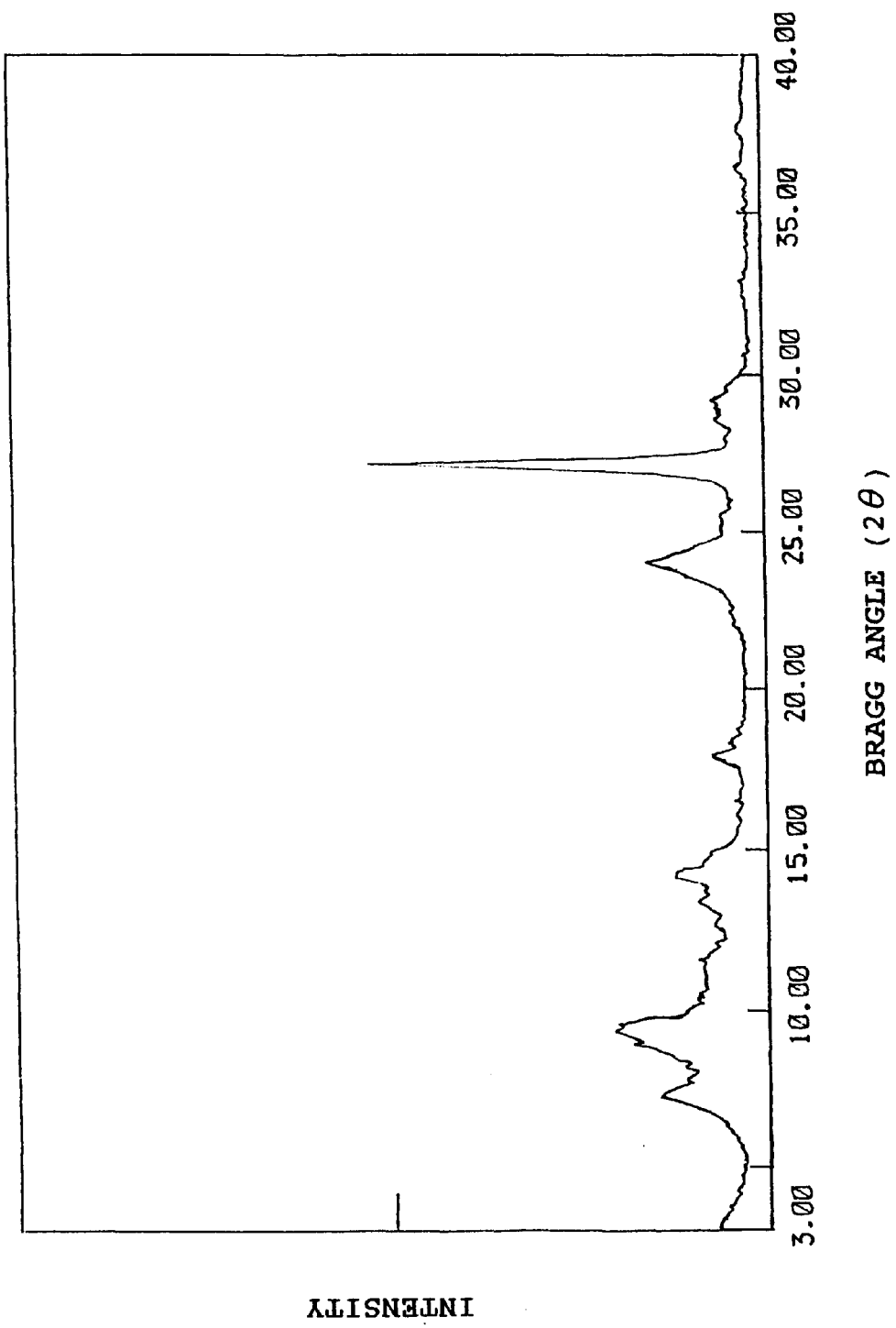
FIG. 15 shows an X-ray diffraction spectrum of TiOPc obtained in Comparative Synthesis Example 5.

Crystal transformation was carried out in the same manner as in Synthesis Example 1 except that 2.0 g of the naphthalene was replaced with 2.0 g of n-octane. As a result, 0.9 g of a crystal was obtained. FIG. 15 shows an X-ray diffraction spectrum of the obtained crystal form.

Comparative Synthesis Example 6

Figure 16:
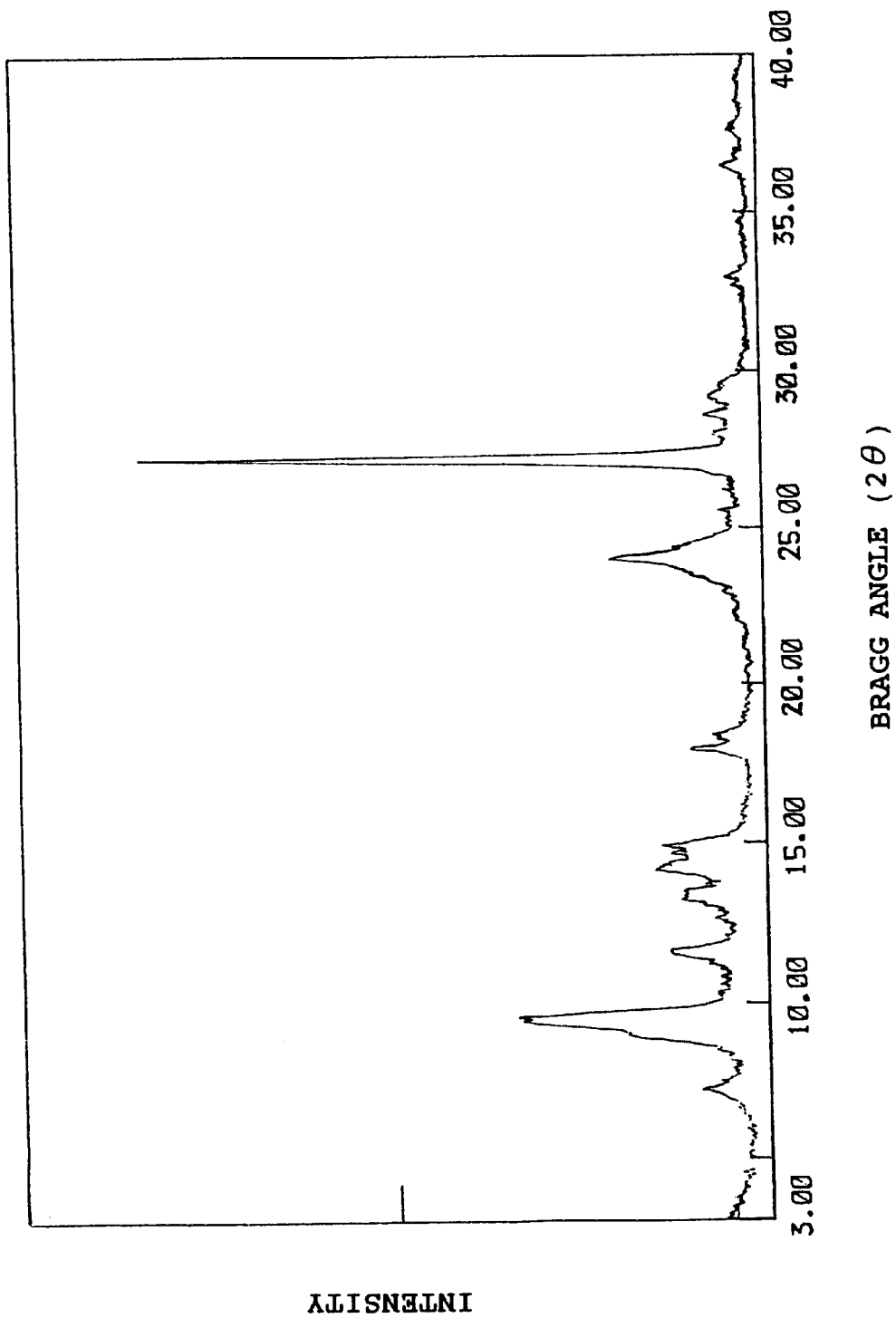
FIG. 16 shows an X-ray diffraction spectrum of TiOPc obtained in Comparative Synthesis Example 6.

Crystal transformation was carried out in the same manner as in Synthesis Example 1 except that 2.0 g of the naphthalene was replaced with 2.0 g of terpinolene. As a result, 0.9 g of a crystal was obtained. FIG. 16 shows an X-ray diffraction spectrum of the obtained crystal form.

Comparative Synthesis Example 7

Figure 17:
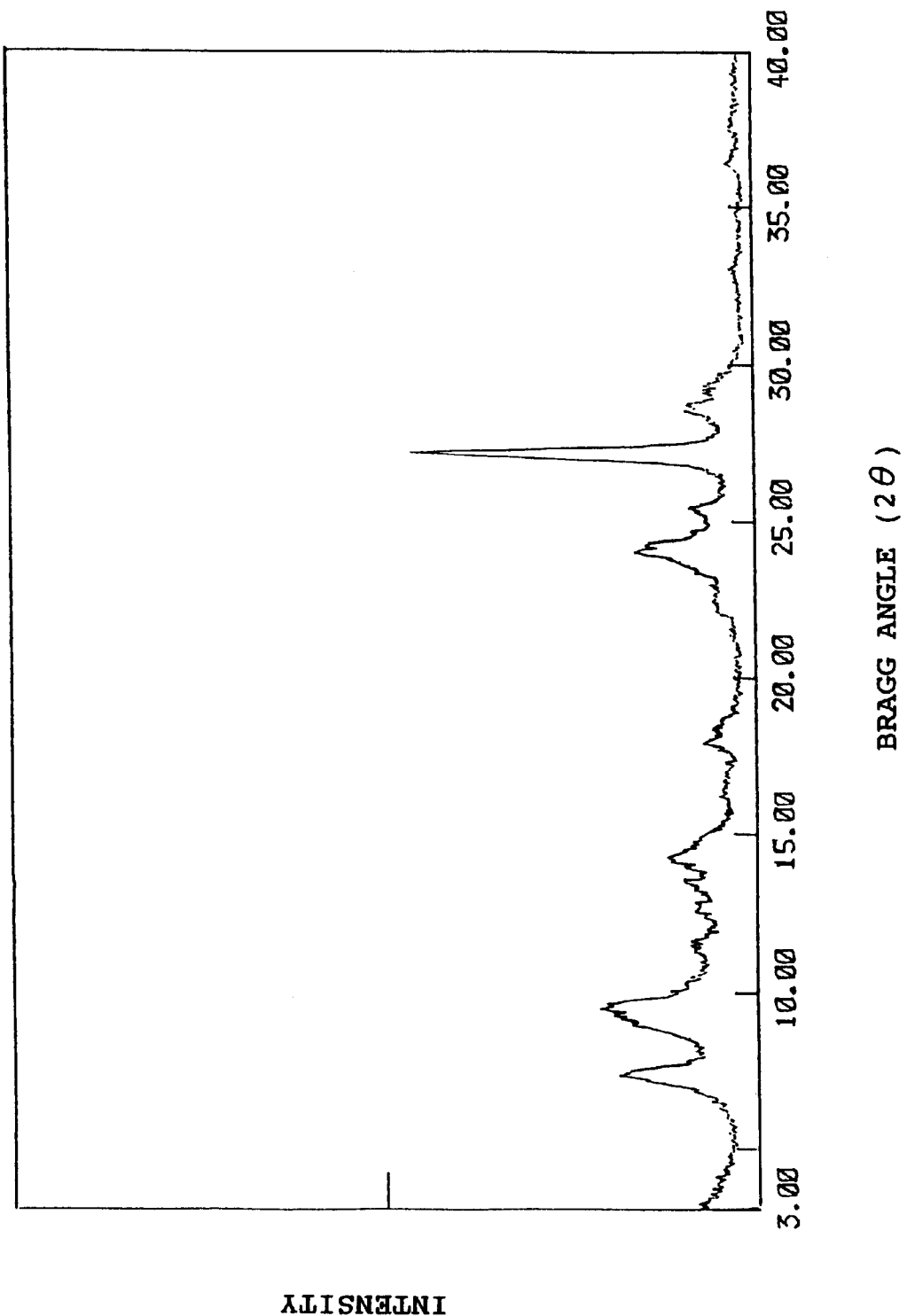
FIG. 17 shows an X-ray diffraction spectrum of TiOPc obtained in Comparative Synthesis Example 7.

Crystal transformation was carried out in the same manner as in Synthesis Example 1 except that 2.0 g of the naphthalene was replaced with 2.0 g of cyclohexanone. As a result, 0.9 g of a crystal was obtained. FIG. 17 shows an X-ray diffraction spectrum of the obtained crystal form.

Example 1

1 Part by weight of the TiOPc obtained in Synthesis Example 3, 1 part by weight of a polyester resin (Vylon 220, manufactured by Toyobo Co., Ltd.) and 100 parts by weight of methyl ethyl ketone were dispersed together with glass beads with a paint conditioner. The resultant dispersion was applied onto an aluminum-deposited polyester with an applicator, to form a charge-generating layer having a thickness of approximately 0.2 μm. Then, a compound shown by the formula (47)

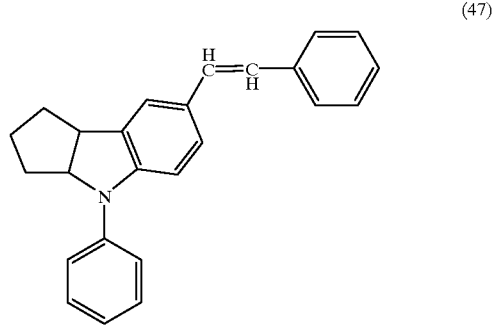

(47)

was mixed with polyarylate resin (U-polymer, manufactured by Unitika, Ltd.) in a weight ratio of 1:1, and dichloroethane was used as a solvent to prepare a solution of 10% by weight of the mixture in the dichloroethane. The solution was applied to the above charge-generating layer with an automatic film applicator (No. 542AB, Yasuda Seiki Seisakusho Ltd.), to form a charge-transporting layer having a thickness of 20 μm.

The above-prepared double-layer photoreceptor was evaluated for electrophotographic properties with an electrostatic paper analyzer (EPA-8200, manufactured by Kawaguchi Electric Mfg. Co., Ltd.).

Measurement conditions

Applied voltage –4.7 kV, static No. 3 (turn speed mode of turn table: 10 m/minute)

As a result, the photoreceptor showed a charge potential (V0) of –750 V and a half decay exposure (E ½) of 0.49 lux•second or remarkably high-sensitivity values, and it showed a dark decay (DD) of 96%.

Further, the photoreceptor was evaluated for properties in repeated use, one cycle of the use consisting of charging and erasing (erasing lamp: irradiation with 400 lux white lamp for 1 second). A change in charged potential in the 1,000the cycle was determined. The first cycle showed a charge potential (V0) of –750 V, and the 1,000the cycle showed a charge potential (V0) of –730 V, so that almost no decrease in potential was found in repeated use or that the photoreceptor showed stable properties. Further, the first cycle showed a half decay exposure (E ½) of 0.49 lux•second, and the 1,000th cycle showed a half decay exposure (E ½) of 0.49 lux•second, so that the photoreceptor showed no change and showed excellent properties.

Examples 2–8

A photoreceptor was prepared in the same manner as in Example 1 except that the TiOPc obtained in Synthesis Example 3 was replaced in TiOPc obtained in Synthesis Example shown in Table 1. Table 1 also shows the electrophotographic properties thereof.

TABLE 1

| | | First cycle | | | 1000th cycle | |
|---|---|---|---|---|---|---|
| Ex. | SyEx. | V0 (V) | E 1/2* | DD | V0 (V) | E 1/2* |
| 2 | 4 | −760 | 0.50 | 96 | −740 | 0.50 |
| 3 | 5 | −745 | 0.49 | 95 | −725 | 0.49 |
| 4 | 6 | −750 | 0.48 | 96 | −730 | 0.48 |
| 5 | 7 | −720 | 0.49 | 95 | −700 | 0.49 |
| 6 | 8 | −740 | 0.40 | 95 | −730 | 0.40 |

Ex. = Example,
SyEx. = Synthesis Example
*lux · second

Comparative Examples 1–7

A photoreceptor was prepared in the same manner as in Example 1 except that the TiOPc obtained in Synthesis Example 3 was replaced with TiOPc obtained in Comparative Synthesis Example shown in Table 2. Table 2 also shows the electrophotographic properties thereof.

TABLE 2

| | | First cycle | | | 1000th cycle | |
|---|---|---|---|---|---|---|
| CEx. | CSEx. | V0 (V) | E 1/2* | DD | V0 (V) | E 1/2* |
| 1 | 1 | −700 | 0.84 | 88 | −640 | 1.06 |
| 2 | 2 | −780 | 1.12 | 94 | −530 | 1.40 |
| 3 | 3 | −440 | 0.84 | 78 | −400 | 0.92 |
| 4 | 4 | −680 | 0.60 | 90 | −565 | 0.91 |
| 5 | 5 | −505 | 0.73 | 73 | −470 | 1.10 |
| 6 | 6 | −560 | 0.72 | 74 | −520 | 0.96 |
| 7 | 7 | −600 | 0.80 | 71 | −530 | 1.20 |

CEx. = Comparative Example,
CSEx. = Comparative Synthesis Example,
*lux · second Table 2 shows the following. The photoreceptor using TiOPc obtained at low crystal transformation temperature (TiOPc obtained at 60° C., Comparative Example 1) or TiOPc obtained at a high crystal transformation temperature (TiOPc obtained at 97° C., Comparative Example 2) shows a decrease in sensitivity or much decreased stability in repeated use, since no intended crystal form can be obtained. Further, TiOPc obtained in Comparative Synthesis Example 3 showed a low charge potential and inferior dark decay value. TiOPc obtained in Comparative Synthesis Example 4 showed a relatively good sensitivity, while it deteriorated in repeated use. TiOPc's obtained in Comparative Synthesis Examples 5 to 7 were found to be poor in all the properties as compared with those of the TiOPc of the present invention.

Example 7

Figure 18:
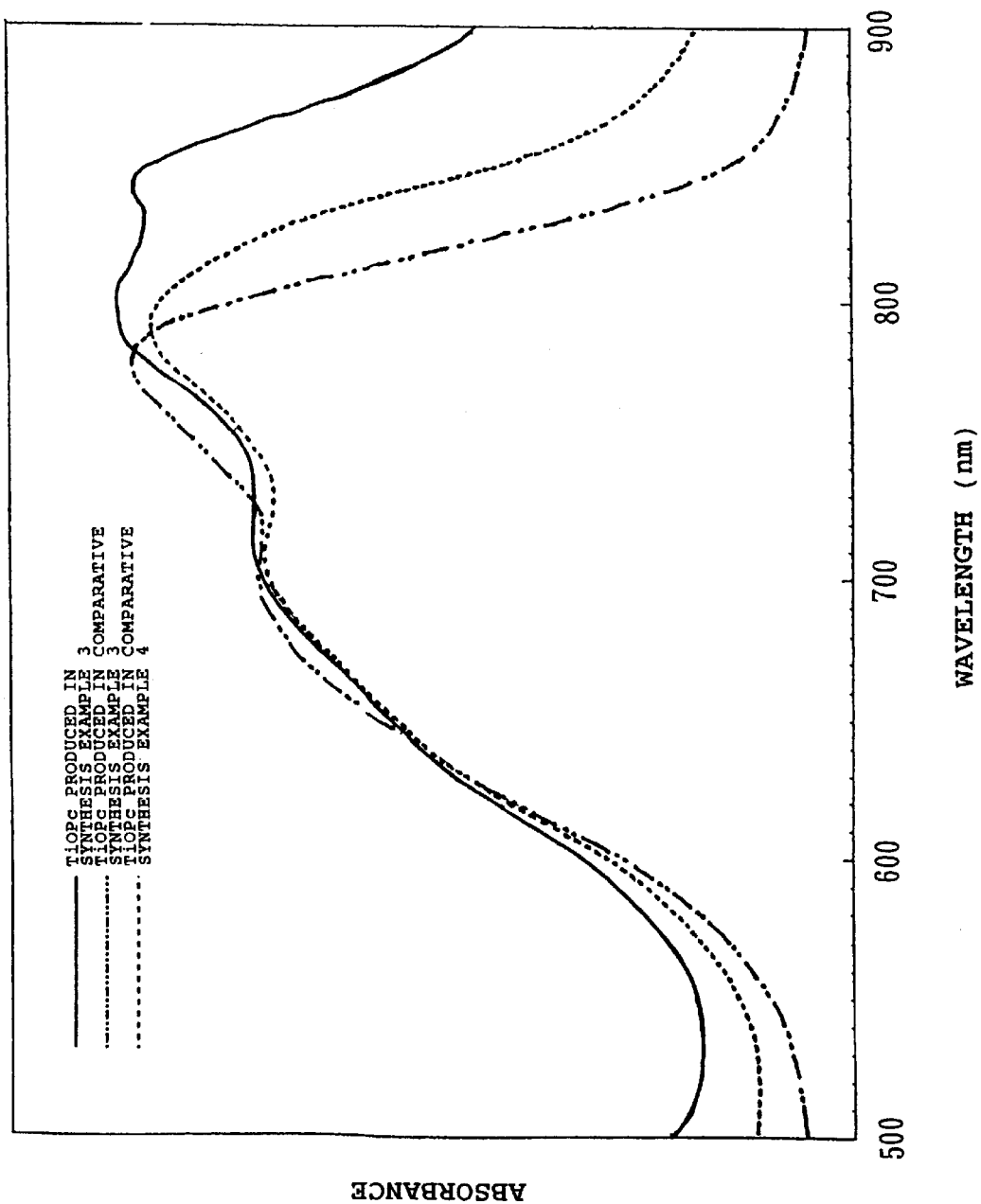
FIG. 18 shows absorption spectra of TiOPc's obtained in Synthesis Example 3 and Comparative Synthesis Examples 3 and 4.

1 Part by weight of TiOPc obtained in Synthesis Example 3, 1 part by weight of a butyral resin (S-LEC BM-S, manufactured by Sekisui Chemical Co., Ltd.) and 100 parts by weight of cyclohexanone were dispersed together with glass beads with a paint conditioner for 1 hour. The resultant dispersion was applied to a transparent glass substrate and dried. The so-obtained sample was measured for an absorption spectrum with a UV-VIS-NIR recording spectrophotometer (UV-3100, manufactured by Shimadzu Co.). FIG. 18 shows the measurement result.

Comparative Examples 8 and 9

A sample was prepared in the same manner as in Example 1 except that the TiOPc obtained in Synthesis Example 3 was replaced with the TiOPc obtained in Comparative Synthesis Example 3 or 4. The samples were measured for absorption intensities in the same manner as in Example 1, and FIG. 18 shows the results.

It is seen from FIG. 18 that the TiOPc obtained in Synthesis Example 3 has absorption in a wavelength region including a longer wavelength region than the TiOPc's obtained in Comparative Synthesis Examples 3 and 4. Table 3 shows intensity ratios (absorption intensity at 850 nm/absorption intensity at 790 nm) obtained on the basis of FIG. 18.

TABLE 3

| TiOPc | Intensity ratio |
|---|---|
| TiOPc obtained in Synthesis Example 3 | 0.962 |
| TiOPc obtained in Comparative Synthesis Example 3 | 0.16 |
| TiOPc obtained in Comparative Synthesis Example 4 | 0.469 |

Table 3 shows that the TiOPc of the present invention has a remarkably high absorption intensity at 850 nm as compared with the TiOPc's obtained in Comparative Synthesis Examples 3 and 4.

Example 8

1 Part by weight of TiOPc obtained in Synthesis Example 3, 1 part by weight of a butyral resin (ESLEC BM-S, manufactured by Sekisui Chemical Co., Ltd.) and 100 parts by weight of cyclohexanone were dispersed together with glass beads with a paint conditioner for 1 hour. The resultant dispersion was applied onto an aluminum-deposited polyester with an applicator, to form a charge-generating layer having a thickness of approximately 0.2 μm. A compound shown by the formula (4)

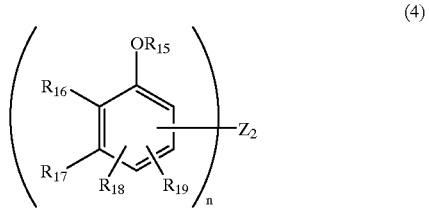

(4)

was mixed with a polyarylate resin (U-polymer, manufactured by Unitika, Ltd.) in a weight ratio of 1:1, and dichloroethane was used as a solvent to prepare a solution of 10% by weight of the mixture in the dichloroethane. The solution was applied to the above charge-generating layer with an applicator to form a charge-transporting layer having a thickness of 20 μm.

Comparative Examples 10 and 11

A photoreceptor was prepared in the same manner as in Example 2 except that the TiOPc obtained in Synthesis Example 3 was replaced with the TiOPc obtained in Comparative Synthesis Example 3 or 4.

The above-obtained multilayer photoreceptors were evaluated for electrophotographic properties with an electrostatic testing device (Synthia-90, manufactured by Gentec Co., Ltd.).

Measurement conditions

Charged voltage −6 kV

Exposure 2 μW/cm$^2$

Process speed 190 mm/second

Figure 19:
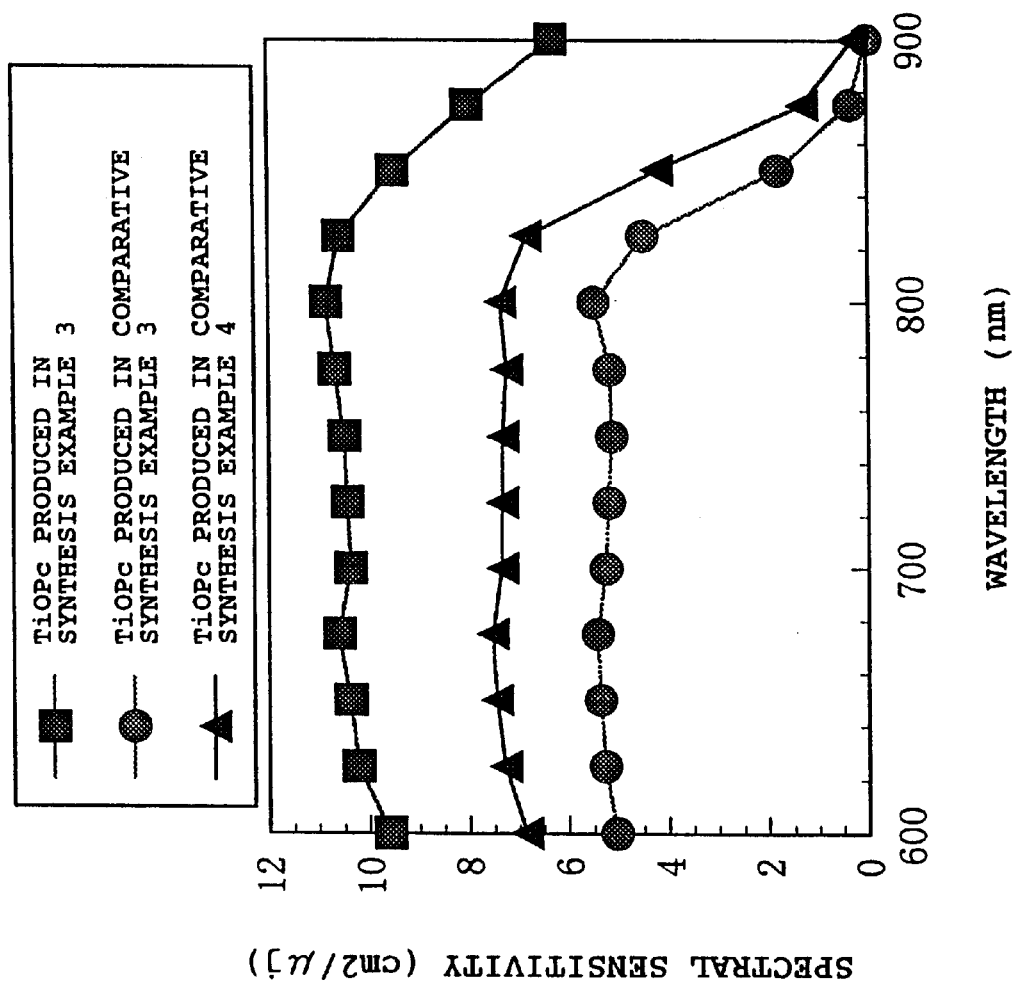
FIG. 19 shows spectral sensitivities of TiOPc's obtained in Synthesis Example 3 and Comparative Synthesis Examples 3 and 4.

The photoreceptors obtained in Example 8 and Comparative Examples 10 and 11 were measured for spectral sensitivities, and FIG. 19 shows the results. It is seen from FIG. 19 that the TiOPc of the present invention has a high sensitivity as compared with the TiOPc's obtained in Comparative Synthesis Examples 3 and 4. Moreover, the TiOPc of the present invention exhibits a remarkably high sensitivity up to 850 nm, and it is therefore seen that it is fully feasible for a semiconductor laser having an oscillation wavelength of 830 nm. In contrast, it is also seen that the TiOPc's obtained in Comparative Synthesis Examples 3 and 4 causes a sharp decrease in sensitivity in a wavelength region from 825 nm to a longer wavelength.

Example 9

100 Parts by weight of the TiOPc obtained in Synthesis Example 3, 100 parts by weight of a vinyl chloride-vinyl acetate copolymer resin (Solbin-CN, manufactured by Nisshin Chemical Industry Co., Ltd.), 30 parts by weight of a compound shown by the formula (8)

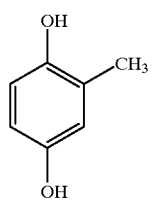

(8)

and 10,000 parts by weight of methyl isobutyl ketone were dispersed together with glass beads with a paint conditioner for 1 hour. The resultant dispersion was applied onto an aluminum-deposited polyester with an applicator, to form a charge-generating layer having a thickness of approximately 0.2 μm. A compound shown by the formula (48)

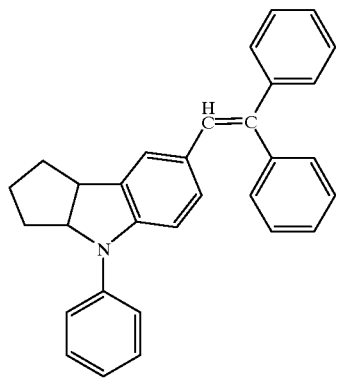

(48)

and a polycarbonate resin (PCZ-400, supplied by Mitsubishi Gas Chemical Co., Inc.) were mixed in a weight ratio of 1:1, and dichloroethane was used as a solvent to prepare a solution of 10% by weight of the mixture in the dichloroethane. The solution was applied to the above charge-generating layer with an applicator to form a charge-transporting layer having a thickness of 25 μm.

The above multilayer photoreceptor was set in an electrostatic testing device (Synthia-90, manufactured by Gentic Co., Ltd.) and subjected to 10,000 cycles of processes including charging, exposure and erasing each cycle. Then, the photoreceptor was allowed to stand for 1 hour and subjected to a process of charging and erasing, and the photoreceptor was measured for a charge potential in the first rotation and a charge potential in the second rotation. Table 4 shows the results. Further, the photoreceptor was set in a copying machine having a process speed of 190 mm/second and using an inversion development method to permit a copying in a first rotation of the photoreceptor, and a blank image was copied. Table 4 also shows an appearance of the obtained copy image.

Examples 10–14

Photoreceptor were prepared in the same manner as in Example 9 except that the compound shown by the formula (8) was replaced with compounds shown in Table 4. The photoreceptors were evaluated in the same manner as in Example 9, and Table 4 also shows the results.

TABLE 4

| Example | Compound of the formula | Charge potential (V) after standing for 1 hour | | Appearance of copy image |
|---|---|---|---|---|
| | | First cycle | Second cycle | |
| 9 | (8) | −615 | −619 | Excellent |
| 10 | (17) | −630 | −633 | Excellent |
| 11 | (24) | −624 | −627 | Excellent |
| 12 | (32) | −621 | −625 | A few black dots found |
| 13 | (38) | −620 | −624 | Excellent |
| 14 | (45) | −623 | −628 | A few black dots found |

Comparative Examples 12–17

Photoreceptors were prepared in the same manner as in Examples 9–14 except that the TiOPc obtained in Systhesis Example 3 was replaced with the TiOPc obtained in Comparative Synthesis Example 7. The photoreceptors were evaluated in the same manner as in Example 9, and Table 5 shows the results.

TABLE 5

| Comparative Example | Charge potential (V) after standing for 1 hour | | Appearance of copy image |
|---|---|---|---|
| | First cycle | Second cycle | |
| 12 | −424 | −538 | Fogging, and many fine black dots found |
| 13 | −407 | −527 | Fogging, and many fine black dots found |
| 14 | −416 | −524 | Fogging, and many fine black dots found |
| 15 | −422 | −541 | Fogging, and many fine black dots found |
| 16 | −412 | −533 | Fogging, and many fine black dots found |
| 17 | −408 | −537 | Fogging, and many fine black dots found |

In Comparative Examples 12 to 17, the photoreceptors containing the TiOPc obtained in Comparative Synthesis Example 7 are poor in chargeability in the first cycle after repeated use and cause image defects such as a decrease in contrast of copy image and the occurrence of fogging. In contrast, when the TiOPc of the present invention is used in a charge-generating layer, the chargeability in a first cycle is excellent, and no copy defects take place.

Example 15

5 Parts by weight of the TiOPc obtained in synthesis Example 3 and 100 parts by weight of tetrahydrofuran were dispersed together with zirconia beads with a ball mill, to prepare a dispersion. After 24 hours, 50 parts by weight of a compound of the formula (48) shown above, a polycarbonate resin (PCZ-200, manufactured by Mitsubishi Gas Chemical Co., Inc.) and 700 parts by weight of tetrahydrofuran were added to the dispersion, and the mixture was further dispersed with a ball mill for 30 minutes. Then, the resultant dispersion was applied onto an aluminum-deposited polyester with an applicator, to form a photosensitive layer having a thickness of approximately 15 μm. The so-obtained single-layer photoreceptor was evaluated for electrophotographic properties in the same manner as in Example 1 except that the charged voltage was changed to +5 kV. The photoreceptor showed excellent properties, i.e., a charge potential (V0) of +440 V in the first cycle, a half decay exposure (E ½) of 0.60 lux•second, a charged voltage (V0) of +420 V after 1,000 cycles in repeated use and a half decay exposure (E ½) of 0.60 lux•second after 1,000 cycles in repeated use.

As is clear from the above explanations, the TiOPc of the present invention does not at all require the use of a halogen substance in the production thereof. When the TiOPc of the present invention is used, there can be provided an electrophotographic photoreceptor having excellent properties.

What is claimed is:

1. A oxytitanium phthalocyanine having peaks at Bragg angles (2θ±0.2°), to X-ray at CuKα 1.541 Å, of 9.5°, 13.5°, 14.2°, 18.0°, 24.0° and 27.2°.

2. A oxytitanium phthalocyanine having peaks at Bragg angles (2θ±0.2°), to X-ray at CuKα 1.541 Å, of 9.5°, 13.5°, 14.2°, 18.0°, 24.0° and 27.2° and having an intense peak at 734 cm$^{-1}$ in absorption peaks (±2 cm$^{-1}$) in an infrared absorption spectrum.

3. A oxytitanium phthalocyanine having peaks at Bragg angles (2θ±0.2°), to X-ray at CuKα 1.541 Å, of 9.5°, 13.5°, 14.2°, 18.0°, 24.0° and 27.2° and having an absorption intensity ratio of at least 0.6, the absorption intensity ratio being a ratio of an absorption intensity at 850 nm to an absorption intensity at 790 nm (absorption intensity at 850 nm/absorption intensity at 790 nm).

4. An electrophotographic photoreceptor comprising a photosensitive layer containing the oxytitanium phthalocyanine recited in claim 1 formed on an electrically conductive support.

5. An electrophotographic photoreceptor comprising a photosensitive layer containing the oxytitanium phthalocyanine recited in claim 1 and a compound of the following formula (1) formed on an electrically conductive support,

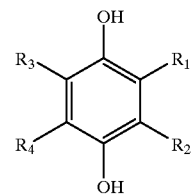

(1)

wherein each of $R_1$, $R_2$, $R_3$ and $R_4$ is independently hydrogen, halogen, alkyl, aryl, alkenyl, alkoxy, alkylthio, carbamoyl, nitro or carboxyl.

6. An electrophotographic photoreceptor comprising a photosensitive layer containing the oxytitanium phthalocyanine recited in claim 1 and a compound of the following formula (2) formed on an electrically conductive support,

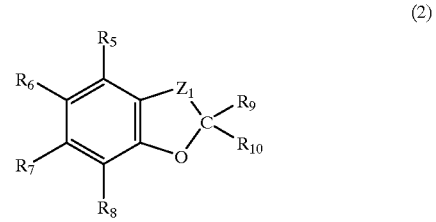

(2)

wherein each of $R_5$, $R_6$, $R_7$ and $R_8$ is independently hydrogen, hydroxyl, alkyl or alkoxy, provided that at least one of $R_5$ to $R_8$ is hydroxyl, each of $R_9$ and $R_{10}$ is independently hydrogen, alkyl or alkenyl, and $Z_1$ is an atomic group necessary for forming a 2H-chromene structure, a chroman structure or dihydrobenzofuran structure together with a benzene ring in the formula, provided that the atomic group may further contain a substituent or substituents.

7. An electrophotographic photoreceptor comprising a photosensitive layer containing the oxytitanium phthalocyanine recited in claim 1 and a compound of the following formula (3) formed on an electrically conductive support,

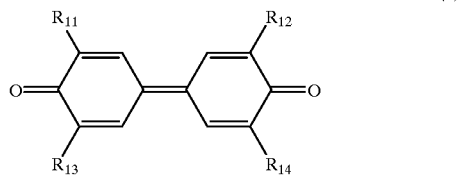

(3)

wherein each of $R_{11}$, $R_{12}$, $R_{13}$ and $R_{14}$ is independently hydrogen, halogen, alkyl or alkoxy.

8. An electrophotographic photoreceptor comprising a photosensitive layer containing the oxytitanium phthalocyanine recited in claim 1 and a compound of the following formula (4) formed on an electrically conductive support, (4)

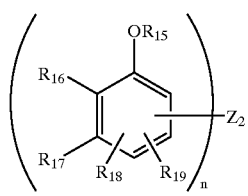

wherein $R_{15}$ is hydrogen, alkyl or aryl, $R_{16}$ is alkyl, each of $R_{17}$, $R_{18}$ and $R_{19}$ is independently hydrogen, alkyl or aryl, and n is an integer of 1 to 4, provided that when n is 1, $Z_2$ is hydrogen, alkyl or aryl and that when n is 2 or more, $Z_2$ is alkylene, arylene or sulfide.

9. An electrophotographic photoreceptor comprising a photosensitive layer containing the oxytitanium phthalocyanine recited in claim 1 and a compound of the following formula (5) formed on an electrically conductive support, (5)

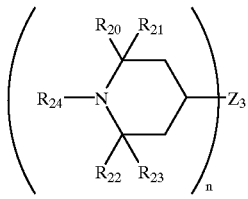

wherein each of $R_{20}$, $R_{21}$, $R_{22}$ and $R_{23}$ is independently alkyl, $R_{24}$ is hydrogen or alkyl, and n is an integer of 1 to 4, provided that when n is 1, $Z_3$ is acyloxy, aroyloxy, alkoxy, aryloxy or $NR_{25}R_{26}$ in which each of $R_{25}$ and $R_{26}$ is hydrogen, alkyl, aryl, aralkyl, acyl, aroyl or arylsulfonyl, and that when n is 2 or more, $Z_3$ is a linking group containing two or more acyloxy or aroyloxy groups.

10. An electrophotographic photoreceptor comprising a photosensitive layer containing the oxytitanium phthalocyanine recited in claim 1 and a compound of the following formula (6) formed on an electrically conductive support, (6)

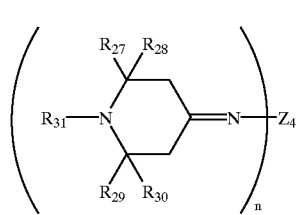

wherein each of $R_{27}$, $R_{28}$, $R_{29}$ and $R_{30}$ is independently alkyl, $R_{31}$ is hydrogen or alkyl, and n is an integer of 1 to 4, provided that when n is 1, $Z_4$ is acyloxy, aroyloxy, alkoxy or $NR_{32}R_{33}$ in which each of $R_{32}$ and $R_{33}$ is hydrogen, alkyl, aryl, aralkyl, acyl, aroyl or arylsulfonyl, and that when n is 2 or more, $Z_4$ is a linking group containing two or more acyloxy or acryloxy groups.

\* \* \* \* \*